United States Patent
Elshafie et al.

(10) Patent No.: US 11,627,019 B2
(45) Date of Patent: Apr. 11, 2023

(54) MANAGING SOUNDING REFERENCE SIGNAL REPETITIONS THROUGH DOWNLINK CONTROL INFORMATION

(71) Applicant: QUALCOMM Incorporated, San Diego, CA (US)

(72) Inventors: Ahmed Elshafie, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 9 days.

(21) Appl. No.: 17/330,815

(22) Filed: May 26, 2021

(65) Prior Publication Data

US 2022/0385502 A1 Dec. 1, 2022

(51) Int. Cl.
| | |
|---|---|
| *H04W 72/04* | (2009.01) |
| *H04L 25/02* | (2006.01) |
| *H04L 5/00* | (2006.01) |
| *H04L 1/1607* | (2023.01) |
| *H04W 72/0446* | (2023.01) |

(52) U.S. Cl.
CPC ........ *H04L 25/0226* (2013.01); *H04L 1/1614* (2013.01); *H04L 5/0051* (2013.01); *H04W 72/042* (2013.01); *H04W 72/0446* (2013.01)

(58) Field of Classification Search
CPC .............. H04W 72/048; H04W 72/042; H04W 72/0446; H04W 88/08; H04L 25/022; H04L 25/0226; H04L 1/1614; H04L 5/0051; H04L 5/0048
See application file for complete search history.

(56) References Cited

U.S. PATENT DOCUMENTS

| | | | |
|---|---|---|---|
| 10,666,334 B2 | 5/2020 | Xiong et al. | |
| 2013/0294318 A1 | 11/2013 | Amerga et al. | |
| 2017/0331670 A1* | 11/2017 | Parkvall | ............... H04B 7/0695 |
| 2020/0389885 A1* | 12/2020 | Tomeba | ................ H04W 88/02 |
| 2021/0126816 A1* | 4/2021 | Davydov | .......... H04W 72/0493 |

* cited by examiner

*Primary Examiner* — Wei Zhao
(74) *Attorney, Agent, or Firm* — Holland & Hart LLP

(57) ABSTRACT

Methods, systems, and devices for wireless communications are described. A user equipment (UE) may transmit sounding reference signal (SRS) repetitions in a subset of slots based on control signaling (e.g., downlink control information) received from a base station. For example, the base station may transmit an inter-slot bitmap to dynamically indicate which slots the UE is to transmit the SRS repetitions. In some examples, the base station may also configure and indicate intra-slot SRS repetitions to the UE to indicate on which symbols in a slot indicated by the inter-slot bitmap for the SRS repetitions. Additionally or alternatively, the base station may transmit a start and length indicator value (SLIV) to indicate the subset of slots in which the UE is to transmit the SRS repetitions based on indicating one or multiple start symbols and lengths for the UE to transmit the SRS repetitions.

30 Claims, 22 Drawing Sheets

MANAGING SOUNDING REFERENCE SIGNAL REPETITIONS THROUGH DOWNLINK CONTROL INFORMATION

FIELD OF TECHNOLOGY

The following relates to wireless communications, including managing sounding reference signal (SRS) repetitions through downlink control information (DCI).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some cases, a base station may configure a UE to transmit one or more reference signals to the base station, such as sounding reference signals (SRSs), to enable the base station to estimate a channel quality. Based on the reference signals and estimated channel quality, the base station may adjust one or more transmission parameters to improve communications with the UE. Techniques are desired for enhancing transmission of such reference signals.

SUMMARY

The described techniques relate to improved methods, systems, devices, and apparatuses that support managing sounding reference signal (SRS) repetitions through downlink control information (DCI). Generally, the described techniques provide for a user equipment (UE) to transmit SRS repetitions in a subset of slots (e.g., or different length transmission time intervals (TTIs)) based on control signaling and control messages (e.g., DCI) received from a base station. For example, the base station may transmit an inter-slot bitmap to dynamically indicate which slots the UE is to transmit the SRS repetitions. For inter-slot SRS repetitions, the base station may configure an inter-slot bitmap where each bit in the bitmap represents a respective slot in which the UE is, or is not, to transmit the SRS repetitions. In some examples, the base station may also configure and indicate intra-slot SRS repetitions to the UE to indicate on which symbols in a slot indicated by the inter-slot bitmap that the UE is to transmit the SRS repetitions. Additionally or alternatively, the base station may transmit a start and length indicator value (SLIV) to indicate the subset of slots in which the UE is to transmit the SRS repetitions based on indicating one or multiple start symbols and lengths for the UE to transmit the SRS repetitions. In some examples, the base station may indicate the start symbol(s) based on an offset value from a previous configuration for transmitting the SRSs, or the start symbol(s) may override the previous configuration.

A method for wireless communications at a UE is described. The method may include receiving, from a base station, control signaling indicating an SRS configuration identifying a set of multiple TTIs configured for SRS transmission, receiving, based on the SRS configuration, a control message indicating an inter-TTI bitmap that identifies a subset of the set of multiple TTIs, and transmitting, to the base station, an SRS in the subset of the set of multiple TTIs in accordance with the inter-TTI bitmap.

An apparatus for wireless communications at a UE is described. The apparatus may include a processor, memory coupled with the processor, and instructions stored in the memory. The instructions may be executable by the processor to cause the apparatus to receive, from a base station, control signaling indicating an SRS configuration identifying a set of multiple TTIs configured for SRS transmission, receive, based on the SRS configuration, a control message indicating an inter-TTI bitmap that identifies a subset of the set of multiple TTIs, and transmit, to the base station, an SRS in the subset of the set of multiple TTIs in accordance with the inter-TTI bitmap.

Another apparatus for wireless communications at a UE is described. The apparatus may include means for receiving, from a base station, control signaling indicating an SRS configuration identifying a set of multiple TTIs configured for SRS transmission, means for receiving, based on the SRS configuration, a control message indicating an inter-TTI bitmap that identifies a subset of the set of multiple TTIs, and means for transmitting, to the base station, an SRS in the subset of the set of multiple TTIs in accordance with the inter-TTI bitmap.

A non-transitory computer-readable medium storing code for wireless communications at a UE is described. The code may include instructions executable by a processor to receive, from a base station, control signaling indicating an SRS configuration identifying a set of multiple TTIs configured for SRS transmission, receive, based on the SRS configuration, a control message indicating an inter-TTI bitmap that identifies a subset of the set of multiple TTIs, and transmit, to the base station, an SRS in the subset of the set of multiple TTIs in accordance with the inter-TTI bitmap.

In some examples of the method, apparatuses, and non-transitory computer-readable medium described herein, receiving the control message indicating the inter-TTI bitmap may include operations, features, means, or instructions for receiving the inter-TTI bitmap including a set of multiple bits, each bit of the set of multiple bits representing a respective TTI of the set of multiple TTIs.

In some examples of the method, apparatuses, and non-transitory computer-readable medium described herein, receiving the control message may include operations, features, means, or instructions for receiving the control message indicating for the UE to transmit the SRS via a specific SRS resource in each of the subset of the set of multiple TTIs, via each SRS of an SRS resource set in each of the subset of the set of multiple TTIs, via all SRS resources configured in each of the subset of the set of multiple TTIs, or a combination thereof.

In some examples of the method, apparatuses, and non-transitory computer-readable medium described herein, receiving the control signaling indicating the SRS configuration may include operations, features, means, or instructions for receiving the control signaling including a parameter indicating a size of the inter-TTI bitmap.

In some examples of the method, apparatuses, and non-transitory computer-readable medium described herein, receiving the control signaling indicating the SRS configuration may include operations, features, means, or instructions for receiving the control signaling indicating a set of multiple inter-TTI bitmaps, where the control message indicates the inter-TTI bitmap from the set of multiple inter-TTI bitmaps.

In some examples of the method, apparatuses, and non-transitory computer-readable medium described herein, receiving the control message may include operations, features, means, or instructions for receiving the control message including an activation message indicating for the UE to use the inter-TTI bitmap.

In some examples of the method, apparatuses, and non-transitory computer-readable medium described herein, transmitting the SRS may include operations, features, means, or instructions for transmitting the SRS for one or more SRS occasions after the set of multiple TTIs ends, where a number of the one or more SRS occasions corresponds to a size of the inter-TTI bitmap.

In some examples of the method, apparatuses, and non-transitory computer-readable medium described herein, receiving the control message indicating the inter-TTI bitmap may include operations, features, means, or instructions for receiving the control message indicating the inter-TTI bitmap that identifies the subset of the set of multiple TTIs corresponds to a frequency hop of a set of multiple frequency hops, where the SRS may be transmitted at the frequency hop in accordance with the inter-TTI bitmap.

In some examples of the method, apparatuses, and non-transitory computer-readable medium described herein, receiving the control message may include operations, features, means, or instructions for receiving the control message indicating one or more intra-TTI bitmaps identifying one or more subintervals in each of the subset of the set of multiple TTIs, where the SRS may be transmitted in the one or more subintervals in the subset of the set of multiple TTIs based on the one or more intra-TTI bitmaps.

In some examples of the method, apparatuses, and non-transitory computer-readable medium described herein, receiving the control message may include operations, features, means, or instructions for receiving a single intra-TTI bitmap that may be used for each of the set of multiple TTIs.

Some examples of the method, apparatuses, and non-transitory computer-readable medium described herein may further include operations, features, means, or instructions for receiving the control message or a second control message indicating a set of multiple intra-TTI bitmaps, each of the set of multiple intra-TTI bitmaps corresponding to a respective TTI of the set of multiple TTIs.

In some examples of the method, apparatuses, and non-transitory computer-readable medium described herein, the one or more intra-TTI bitmaps may be configured per SRS resource.

Some examples of the method, apparatuses, and non-transitory computer-readable medium described herein may further include operations, features, means, or instructions for disabling the inter-TTI bitmap after the set of multiple TTIs ends.

In some examples of the method, apparatuses, and non-transitory computer-readable medium described herein, a size of the inter-TTI bitmap corresponds to a number of repetitions configured for SRS transmission across the set of multiple TTIs, to a window size configured for SRS transmission, or a combination thereof.

A method for wireless communications at a UE is described. The method may include receiving control signaling indicating an SRS configuration identifying a set of multiple TTIs configured for SRS transmission, receiving, based on the SRS configuration, a control message indicating a starting location of an SRS transmission and a length of the SRS transmission within a first TTI of the set of multiple TTIs, and transmitting, to a base station, an SRS in the first TTI in accordance with the control message.

An apparatus for wireless communications at a UE is described. The apparatus may include a processor, memory coupled with the processor, and instructions stored in the memory. The instructions may be executable by the processor to cause the apparatus to receive control signaling indicating an SRS configuration identifying a set of multiple TTIs configured for SRS transmission, receive, based on the SRS configuration, a control message indicating a starting location of an SRS transmission and a length of the SRS transmission within a first TTI of the set of multiple TTIs, and transmit, to a base station, an SRS in the first TTI in accordance with the control message.

Another apparatus for wireless communications at a UE is described. The apparatus may include means for receiving control signaling indicating an SRS configuration identifying a set of multiple TTIs configured for SRS transmission, means for receiving, based on the SRS configuration, a control message indicating a starting location of an SRS transmission and a length of the SRS transmission within a first TTI of the set of multiple TTIs, and means for transmitting, to a base station, an SRS in the first TTI in accordance with the control message.

A non-transitory computer-readable medium storing code for wireless communications at a UE is described. The code may include instructions executable by a processor to receive control signaling indicating an SRS configuration identifying a set of multiple TTIs configured for SRS transmission, receive, based on the SRS configuration, a control message indicating a starting location of an SRS transmission and a length of the SRS transmission within a first TTI of the set of multiple TTIs, and transmit, to a base station, an SRS in the first TTI in accordance with the control message.

In some examples of the method, apparatuses, and non-transitory computer-readable medium described herein, receiving the control message may include operations, features, means, or instructions for receiving the control message indicating the starting location as an offset value from a previously configured starting location.

In some examples of the method, apparatuses, and non-transitory computer-readable medium described herein, receiving the control message may include operations, features, means, or instructions for receiving the control message indicating a set of multiple starting locations, each starting location of the set of multiple starting locations configured for a respective TTI of the set of multiple TTIs, where the set of multiple starting locations includes the starting location of the SRS transmission within the first TTI.

In some examples of the method, apparatuses, and non-transitory computer-readable medium described herein, receiving the control message may include operations, features, means, or instructions for receiving the control message indicating the length of the SRS transmission within the first TTI that overrides a previously configured repetition factor for the SRS transmission.

In some examples of the method, apparatuses, and non-transitory computer-readable medium described herein, receiving the control message may include operations, features, means, or instructions for receiving the control message indicating a set of multiple lengths, each length of the set of multiple lengths configured for a respective TTI of the set of multiple TTIs, where the set of multiple lengths includes the length of the SRS transmission within the first TTI.

Some examples of the method, apparatuses, and non-transitory computer-readable medium described herein may further include operations, features, means, or instructions for receiving an additional control message indicating a different value for the length of the SRS transmission, where a previously configured repetition factor for the SRS transmission may be used based on the additional control message indicating the different value for the length.

In some examples of the method, apparatuses, and non-transitory computer-readable medium described herein, the different value for the length may include an invalid value or a negative value.

Some examples of the method, apparatuses, and non-transitory computer-readable medium described herein may further include operations, features, means, or instructions for receiving a set of multiple starting location and length pairs configured for SRS transmission, where the control message indicates an individual starting location and length pair of the set of multiple starting location and length pairs.

In some examples of the method, apparatuses, and non-transitory computer-readable medium described herein, a same or different starting location and length pair may be indicated for each of the set of multiple TTIs.

In some examples of the method, apparatuses, and non-transitory computer-readable medium described herein, receiving the control message may include operations, features, means, or instructions for receiving the control message per SRS resource or per SRS resource set.

A method for wireless communications at a base station is described. The method may include transmitting, to a UE, control signaling indicating an SRS configuration identifying a set of multiple TTIs configured for SRS transmission, transmitting, to the UE based on the SRS configuration, a control message indicating an inter-TTI bitmap that identifies a subset of the set of multiple TTIs, and receiving, from the UE, an SRS in the subset of the set of multiple TTIs in accordance with the inter-TTI bitmap.

An apparatus for wireless communications at a base station is described. The apparatus may include a processor, memory coupled with the processor, and instructions stored in the memory. The instructions may be executable by the processor to cause the apparatus to transmit, to a UE, control signaling indicating an SRS configuration identifying a set of multiple TTIs configured for SRS transmission, transmit, to the UE based on the SRS configuration, a control message indicating an inter-TTI bitmap that identifies a subset of the set of multiple TTIs, and receive, from the UE, an SRS in the subset of the set of multiple TTIs in accordance with the inter-TTI bitmap.

Another apparatus for wireless communications at a base station is described. The apparatus may include means for transmitting, to a UE, control signaling indicating an SRS configuration identifying a set of multiple TTIs configured for SRS transmission, means for transmitting, to the UE based on the SRS configuration, a control message indicating an inter-TTI bitmap that identifies a subset of the set of multiple TTIs, and means for receiving, from the UE, an SRS in the subset of the set of multiple TTIs in accordance with the inter-TTI bitmap.

A non-transitory computer-readable medium storing code for wireless communications at a base station is described. The code may include instructions executable by a processor to transmit, to a UE, control signaling indicating an SRS configuration identifying a set of multiple TTIs configured for SRS transmission, transmit, to the UE based on the SRS configuration, a control message indicating an inter-TTI bitmap that identifies a subset of the set of multiple TTIs, and receive, from the UE, an SRS in the subset of the set of multiple TTIs in accordance with the inter-TTI bitmap.

In some examples of the method, apparatuses, and non-transitory computer-readable medium described herein, transmitting the control message indicating the inter-TTI bitmap may include operations, features, means, or instructions for transmitting the inter-TTI bitmap including a set of multiple bits, each bit of the set of multiple bits representing a respective TTI of the set of multiple TTIs.

In some examples of the method, apparatuses, and non-transitory computer-readable medium described herein, transmitting the control message may include operations, features, means, or instructions for transmitting the control message indicating for the UE to transmit the SRS via a specific SRS resource in each of the subset of the set of multiple TTIs, via each SRS of an SRS resource set in each of the subset of the set of multiple TTIs, via all SRS resources configured in each of the subset of the set of multiple TTIs, or a combination thereof.

In some examples of the method, apparatuses, and non-transitory computer-readable medium described herein, transmitting the control signaling indicating the SRS configuration may include operations, features, means, or instructions for transmitting the control signaling including a parameter indicating a size of the inter-TTI bitmap.

In some examples of the method, apparatuses, and non-transitory computer-readable medium described herein, transmitting the control signaling indicating the SRS configuration may include operations, features, means, or instructions for transmitting, to the UE, the control message indicating a set of multiple inter-TTI bitmaps for SRS transmission, where the control message indicates the inter-TTI bitmap from the set of multiple inter-TTI bitmaps.

In some examples of the method, apparatuses, and non-transitory computer-readable medium described herein, transmitting the control signaling indicating the SRS configuration may include operations, features, means, or instructions for transmitting, to the UE, the control message including an activation message indicating for the UE to use the inter-TTI bitmap for SRS transmission.

In some examples of the method, apparatuses, and non-transitory computer-readable medium described herein, receiving the SRS may include operations, features, means, or instructions for receiving the SRS for one or more SRS occasions after the set of multiple TTIs ends, where a number for the one or more SRS occasions corresponds to a size of the inter-TTI bitmap.

In some examples of the method, apparatuses, and non-transitory computer-readable medium described herein, transmitting the control message indicating the inter-TTI bitmap may include operations, features, means, or instructions for transmitting the control message indicating the inter-TTI bitmap that identifies the subset of the set of multiple TTIs for a frequency hop of a set of multiple frequency hops, where the SRS may be received at the frequency hop in accordance with the inter-TTI bitmap.

In some examples of the method, apparatuses, and non-transitory computer-readable medium described herein, transmitting the control message may include operations, features, means, or instructions for transmitting, to the UE, the control message indicating one or more intra-TTI bitmaps identifying one or more subintervals in each of the subset of the set of multiple TTIs for SRS transmission, where the SRS may be received in the one or more subintervals in the subset of the set of multiple TTIs based on the one or more intra-TTI bitmaps.

In some examples of the method, apparatuses, and non-transitory computer-readable medium described herein, transmitting the control message may include operations, features, means, or instructions for transmitting a single intra-TTI bitmap that may be used for each of the set of multiple TTIs.

Some examples of the method, apparatuses, and non-transitory computer-readable medium described herein may further include operations, features, means, or instructions for transmitting the control message or a second control message indicating a set of multiple intra-TTI bitmaps, each of the set of multiple intra-TTI bitmaps corresponding to a respective TTI of the set of multiple TTIs.

In some examples of the method, apparatuses, and non-transitory computer-readable medium described herein, the one or more intra-TTI bitmaps may be configured per SRS resource.

In some examples of the method, apparatuses, and non-transitory computer-readable medium described herein, a size of the inter-TTI bitmap corresponds to a number of repetitions configured for SRS transmission across the set of multiple TTIs, to a window size configured for SRS transmission, or a combination thereof.

A method for wireless communications at a base station is described. The method may include transmitting, to a UE, control signaling indicating an SRS configuration identifying a set of multiple TTIs configured for SRS transmission, transmitting, to the UE based on the SRS configuration, a control message indicating a starting location of an SRS transmission and a length of the SRS transmission within a first TTI of the set of multiple TTIs, and receiving, from the UE, an SRS in the first TTI in accordance with the control message.

An apparatus for wireless communications at a base station is described. The apparatus may include a processor, memory coupled with the processor, and instructions stored in the memory. The instructions may be executable by the processor to cause the apparatus to transmit, to a UE, control signaling indicating an SRS configuration identifying a set of multiple TTIs configured for SRS transmission, transmit, to the UE based on the SRS configuration, a control message indicating a starting location of an SRS transmission and a length of the SRS transmission within a first TTI of the set of multiple TTIs, and receive, from the UE, an SRS in the first TTI in accordance with the control message.

Another apparatus for wireless communications at a base station is described. The apparatus may include means for transmitting, to a UE, control signaling indicating an SRS configuration identifying a set of multiple TTIs configured for SRS transmission, means for transmitting, to the UE based on the SRS configuration, a control message indicating a starting location of an SRS transmission and a length of the SRS transmission within a first TTI of the set of multiple TTIs, and means for receiving, from the UE, an SRS in the first TTI in accordance with the control message.

A non-transitory computer-readable medium storing code for wireless communications at a base station is described. The code may include instructions executable by a processor to transmit, to a UE, control signaling indicating an SRS configuration identifying a set of multiple TTIs configured for SRS transmission, transmit, to the UE based on the SRS configuration, a control message indicating a starting location of an SRS transmission and a length of the SRS transmission within a first TTI of the set of multiple TTIs, and receive, from the UE, an SRS in the first TTI in accordance with the control message.

In some examples of the method, apparatuses, and non-transitory computer-readable medium described herein, transmitting the control message may include operations, features, means, or instructions for transmitting the control message indicating the starting location as an offset value from a previously configured starting location.

In some examples of the method, apparatuses, and non-transitory computer-readable medium described herein, transmitting the control message may include operations, features, means, or instructions for transmitting the control message indicating a set of multiple starting locations, each starting location of the set of multiple starting locations configured for a respective TTI of the set of multiple TTIs, where the set of multiple starting locations includes the starting location of the SRS transmission within the first TTI.

In some examples of the method, apparatuses, and non-transitory computer-readable medium described herein, transmitting the control message may include operations, features, means, or instructions for transmitting the control message indicating the length of the SRS transmission within the first TTI that overrides a previously configured repetition factor for the SRS transmission.

In some examples of the method, apparatuses, and non-transitory computer-readable medium described herein, transmitting the control message may include operations, features, means, or instructions for transmitting the control message indicating a set of multiple lengths, each length of the set of multiple lengths configured for a respective TTI of the set of multiple TTIs, where the set of multiple lengths includes the length of the SRS transmission within the first TTI.

Some examples of the method, apparatuses, and non-transitory computer-readable medium described herein may further include operations, features, means, or instructions for transmitting an additional control message indicating a different value for the length of the SRS transmission, where a previously configured repetition factor for the SRS transmission may be used based on the additional control message indicating the different value for the length.

In some examples of the method, apparatuses, and non-transitory computer-readable medium described herein, the different value for the length includes an invalid value or a negative value.

Some examples of the method, apparatuses, and non-transitory computer-readable medium described herein may further include operations, features, means, or instructions for transmitting a set of multiple starting location and length pairs configured for SRS transmission, where the control message indicates an individual starting location and length pair of the set of multiple starting location and length pairs.

In some examples of the method, apparatuses, and non-transitory computer-readable medium described herein, a same or different starting location and length pair may be indicated for each of the set of multiple TTIs.

In some examples of the method, apparatuses, and non-transitory computer-readable medium described herein, transmitting the control message may include operations, features, means, or instructions for transmitting the control message per SRS resource or per SRS resource set.

DETAILED DESCRIPTION

A user equipment (UE) may transmit one or more sounding reference signals (SRSs) to a base station to enable the base station to determine channel quality (e.g., for then adjusting one or more parameters for subsequent communications with the UE). In some cases, the base station may configure the UE to transmit an SRS according to a number of repetitions within a slot (e.g., on multiple symbols in the slot or different length transmission time intervals (TTIs)). Additionally, the base station may configure the UE to transmit an SRS within a single slot or across multiple consecutive slots with the number of repetitions. However, the number of repetitions may be configured via semi-static signaling, such that the UE may transmit the SRSs using an inefficient number of repetitions that had been previously configured.

As described herein, a base station may transmit an inter-slot bitmap to dynamically identify a subset of slots (e.g., a subset of a set of multiple TTIs) in which a UE is to transmit SRS repetitions to beneficially save UE power and reduce inter-UE interference. For example, the base station may configure an inter-slot bitmap and/or a start and length indicator value (SLIV) to indicate the subset of slots in which the UE is to transmit SRS repetitions. In some cases, for inter-slot SRS repetitions, the base station may configure an inter-slot bitmap where each bit in the bitmap represents a respective slot in which the UE is, or is not, to transmit the SRS repetitions. Additionally, the base station may configure and transmit the bitmap for different frequency hops (e.g., different bitmap per each hop). In some examples, the base station may also configure and indicate intra-slot SRS repetitions to the UE to indicate on which symbols in a slot indicated by the inter-slot bitmap that the UE is to transmit the SRS repetitions. For example, an inter-slot bitmap of (1,0,1,0) may indicate that a second and a fourth slot are not used for SRS repetitions and that the UE is to apply the intra-slot bitmap to determine symbols in the first and third slots to transmit the SRS repetitions. Additionally or alternatively, the base station may configure a SLIV to indicate one or multiple start symbols and lengths for the UE to transmit the SRS repetitions. In some examples, the base station may indicate the start symbol(s) based on an offset value from a previous configuration for transmitting the SRSs, or the start symbol(s) may override the previous configuration Aspects of the disclosure are initially described in the context of wireless communications systems. Additionally, aspects of the disclosure are illustrated through additional wireless communications systems, SRS repetition configurations, and process flows. Aspects of the disclosure are further illustrated by and described with reference to apparatus diagrams, system diagrams, and flowcharts that relate to managing SRS repetitions through DCI.

Figure 1:
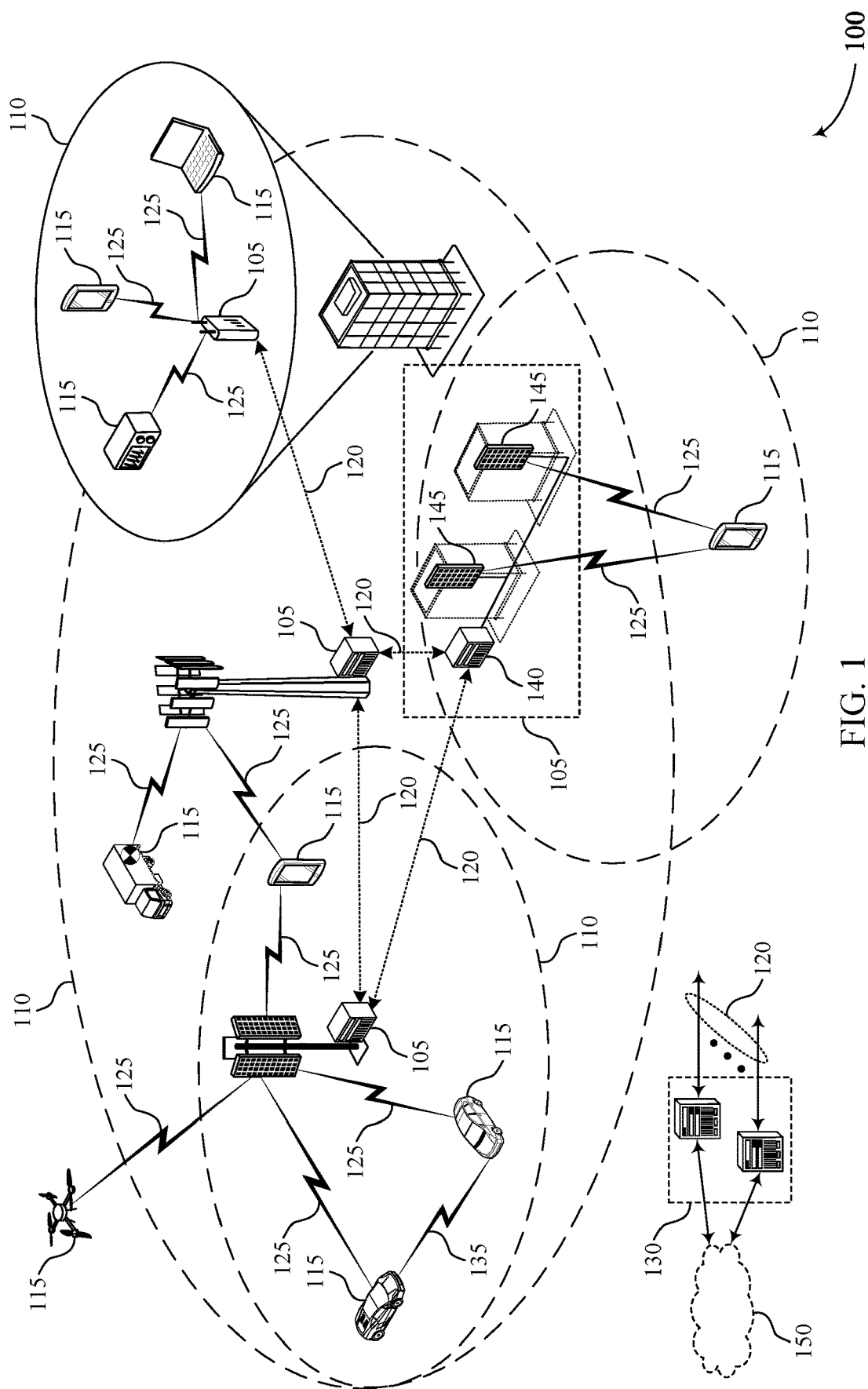
FIG. 1 illustrates an example of a wireless communications system that supports managing sounding reference signal (SRS) repetitions through downlink control information (DCI) in accordance with aspects of the present disclosure.

FIG. 1 illustrates an example of a wireless communications system 100 that supports managing SRS repetitions through DCI in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a base station 105 may configure a UE 115 to transmit one or more reference signals to the base station 105, such as SRSs, to enable the base station 105 to estimate a channel quality. Based on the reference signals and estimated channel quality, the base station 105 may adjust one or more transmission parameters to improve communications with the UE 115. In some cases, the base station 105 may configure the UE 115 to transmit an SRS according to a number of repetitions within a slot (e.g., on multiple symbols in the slot or within or on different length TTIs). For example, each SRS resource may be configured with a repetition factor (e.g., of one (1), two (2), or four (4)) that indicates how the UE 115 is to transmit the SRS repetitions in the slot, which is described in greater detail with reference to FIG. 4A. Additionally, the base station 105 may configure the UE 115 to transmit an SRS within a single slot or across multiple slots (e.g., consecutive slots) with the number of repetitions. For example, the base station 105 may configure the UE 115 with an inter-slot repetition (e.g., 'K' repetitions) that indicates how the UE 115 is to transmit the SRS repetitions across multiple slots, which is described in greater detail with reference to FIG. 4B. However, the number of repetitions may be configured via semi-static signaling, such that the UE 115 may transmit the SRSs using an inefficient number of repetitions that had been previously configured.

Wireless communications system 100 may support efficient techniques for a UE 115 to transmit SRS repetitions in a subset of slots (e.g., or different length TTIs) based on control signaling and control messages (e.g., DCI) received from a base station 105. By configuring and indicating the SRS repetitions through DCI, the base station 105 may improve power savings at the UE 115 (e.g., based on less antenna switching and reducing insertion loss), reduce interference between UEs 115, allow for more efficient UE multiplexing, and increase scheduling flexibility. For example, the base station may transmit an inter-slot bitmap to dynamically indicate which slots the UE is to transmit the SRS repetitions. Additionally or alternatively, the base station may transmit a SLIV to indicate the subset of slots in which the UE is to transmit the SRS repetitions based on indicating one or multiple start symbols and lengths for the UE to transmit the SRS repetitions.

Figure 2:
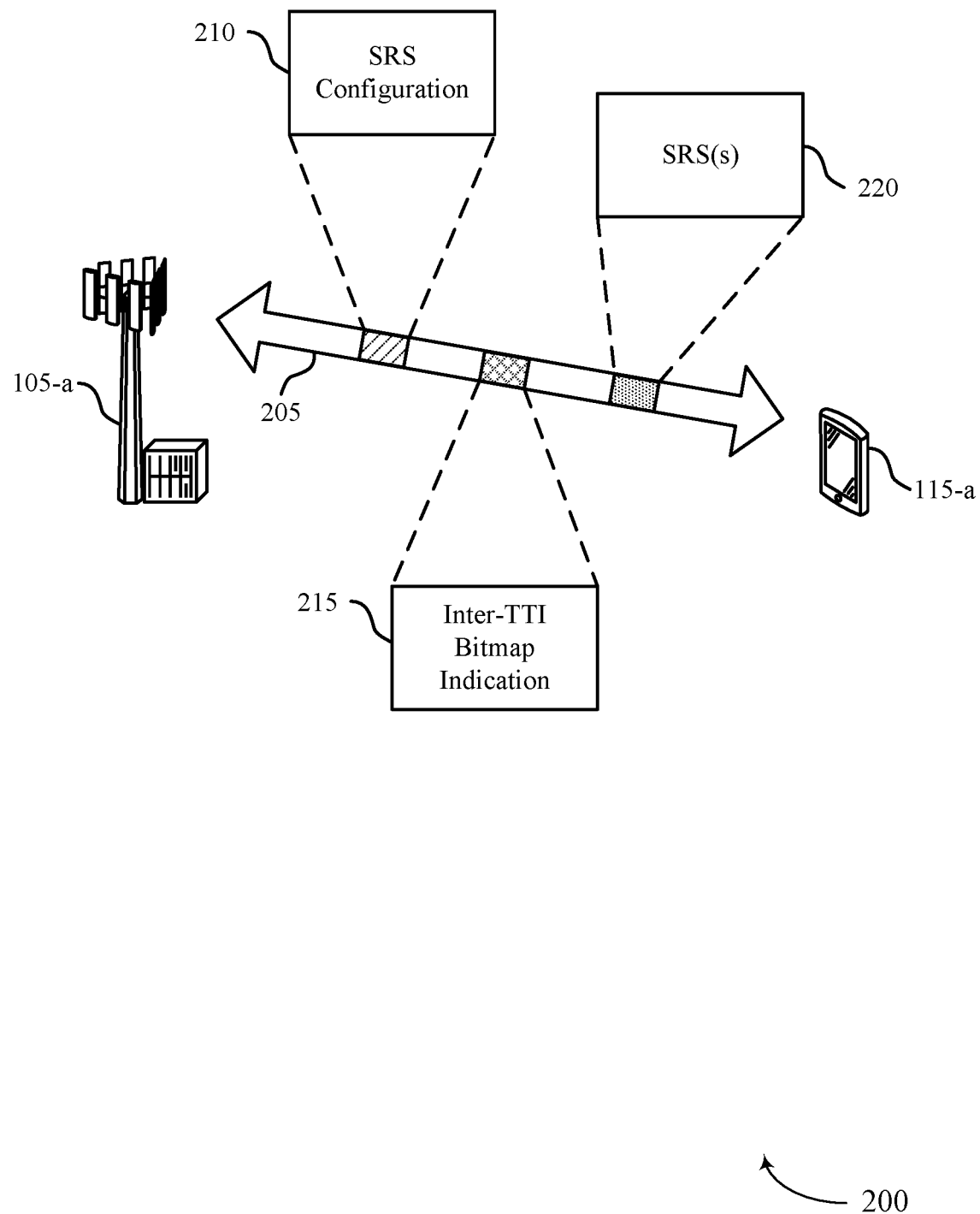
FIGS. 2 and 3 illustrate examples of wireless communications systems in accordance with aspects of the present disclosure.

FIG. 2 illustrates an example of a wireless communications system 200 that supports managing SRS repetitions through DCI in accordance with aspects of the present disclosure. In some examples, wireless communications system 200 may implement aspects of or may be implemented by aspects of wireless communications system 100. For example, wireless communications system 200 may include a base station 105-a and a UE 115-a, which may represent examples of corresponding base stations 105 and UEs 115, respectively, as described with reference to FIG. 1. Additionally, base station 105-a and UE 115-a may communicate control information, data, or both using resources of a carrier 205.

In some examples, base station 105-a may transmit an SRS configuration 210 to UE 115-a (e.g., via control signaling, such as RRC signaling, MAC control element (MAC-CE), or DCI) to indicate different parameters to enable UE 115-a to transmit one or more SRSs 220 to base station 105-a. For example, base station 105-a may configure UE 115-a to transmit one or more SRSs 220 to enable base station 105-a to, for example, estimate a channel or for beam management purposes. In some examples, SRS configuration 210 may include multiple parameters to support the transmission of SRS(s) 220, such as an SRS resource identifier, frequency domain parameters (e.g., a frequency domain position, a frequency domain shift, frequency hopping, etc.), a resource type (e.g., aperiodic, semi-persistent, periodic, etc.), SRS port information (e.g., number of SRS ports, SRS port index, etc.), transmission combination parameters (e.g., combination offsets, cyclic shifts, etc.) sequence identifier, spatial relation information, etc.

Additionally, SRS configuration 210 may include resource mapping information for the transmission of SRS(s) 220, such as an indication of a starting position, a number of symbols, and a repetition factor for the SRS transmissions (e.g., one (1), two (2), or four (4) repetitions per slot/TTI). In some examples, base station 105-a may also configure UE 115-*a* with an inter-slot repetition (e.g., 'K' repetitions) that indicates how UE 115-*a* is to transmit the SRS repetitions across multiple slots. For example, SRS configuration 210 may indicate a set of slots (e.g., set of TTIs) configured for the transmission of SRS(s) 220 and SRS repetitions based on the different parameters. However, it may be inefficient for UE 115-*a* to transmit the SRSs based on the parameters included in SRS configuration 210 alone. For example, base station 105-*a* may determine and signal SRS configuration 210 based on outdated information for or from UE 115-*a*, where the parameters included in SRS configuration 210 may result in UE 115-*a* transmitting one or more SRSs 220 unnecessarily or in slots that are no longer available for the SRS transmissions.

As described herein, assuming inter-slot repetition for the transmission of SRS(s) 220, base station 105-*a* may transmit an inter-TTI bitmap indication 215 (e.g., inter-slot bitmap) to UE 115-*a* (e.g., with a size equal to a configured number of repetitions across slots in case of aperiodic SRS or with a size of window 'M' in case of periodic SRS) to indicate in which TTIs that UE 115-*a* is to transmit SRS(s) 220 that can be used across TTIs (e.g., slots). For example, a single bit in the inter-TTI bitmap may represent an entire TTI for UE 115-*a* to transmit SRS(s) 220. That is, as described previously, SRS configuration 210 may include an indication of a set of TTIs configured for SRS transmissions, and inter-TTI bitmap indication 215 may indicate which of those set of TTIs are to be used by UE 115-*a* for the actual transmission of SRS(s) 220. For example, if SRS configuration 210 includes five (5) TTIs configured for the transmission of SRS(s) 220, inter-TTI bitmap indication 215 may include five (5) bits, where each of the five (5) bits corresponds to a different TTI of the configured five (5) TTIs to indicate in which TTIs that UE 115-*a* is to transmit SRS(s) 220 (e.g., a '0' may indicate that corresponding TTI is not to be used for the SRS transmissions, and a '1' may indicate that corresponding TTI is to be used for the SRS transmissions). In some cases, the configured set of TTIs may repeat and the SRS configuration may apply in the next cycle of the TTI set.

In some examples, UE 115-*a* may transmit SRS(s) 220 in a TTI indicated by a corresponding bit in the inter-TTI bitmap using a single SRS resource in the TTI (e.g., based on a corresponding repetition factor), an SRS resource set in the TTI (e.g., all SRS resources of an SRS resource set may not be used if the bitmap bit is '0'), or all SRS resources within the TTI (e.g., regardless of the source or resource set that those SRS resources belong to). For example, each SRS resource set may be configured (e.g., by base station 105-*a*) with up to 16 SRS resources, and each SRS resource set may include aperiodic, semi-persistent, or periodic SRS resources. As an example, an SRS resource set may include four (4) SRS resources with each SRS resource including four (4) symbols. In another example, an SRS resource set may include 16 SRS resources with each SRS resource including one (1) symbol. For an aperiodic SRS transmission case, a periodicity of the SRS transmissions may be represented by a separation between inter-slot repetitions.

Base station 105-*a* may configure (e.g., via RRC, MAC-CE, etc.) a parameter bitmap size of size 'M' (e.g., via SRS configuration 210, inter-TTI bitmap indication 215, or both), where every 'M' periodic SRS, a bitmap is applied to either use an SRS resource (or SRS resource set) in a corresponding TTI (e.g., slot) or not. For example, base station 105-*a* may configure 'M' via RRC or MAC-CE signaling. In some examples, base station 105-*a* may signal one or more inter-TTI bitmaps in RRC/MAC-CE using tables (e.g., multiple inter-TTI bitmaps, each corresponding to a respective entry in a table) and then may transmit a DCI to indicate one of the inter-TTI bitmaps for UE 115-*a* to apply for transmitting SRS(s) 220. Additionally or alternatively, base station 105-*a* may signal the inter-TTI bitmap (e.g., via inter-TTI bitmap indication 215) explicitly in a DCI.

In some examples, base station 105-*a* may enable or disable the use of the inter-TTI bitmap for UE 115-*a* in RRC/MAC-CE. If enabled, base station 105-*a* may configure 'M' and may configure the inter-TTI bitmap itself. For example, base station 105-*a* may configure the inter-TTI bitmap via DCI (e.g., or at least indicated by DCI from a list of preconfigured bitmaps in RRC/MAC-CE) and/or may initially configure the inter-TTI bitmap in RRC/MAC-CE signaling. If UE 115-*a* does not receive a new indication of a same or different inter-TTI bitmap after 'M' (e.g., after a number of TTIs indicated in the inter-TTI bitmap ends, where 'M' corresponds to the number of TTIs or a size of the inter-TTI bitmap, such as a number of bits in the inter-TTI bitmap), UE 115-*a* may disable the inter-TTI bitmap or may not use the inter-TTI bitmap for subsequent SRS transmissions (e.g., there is no use for the inter-TTI bitmap). Additionally or alternatively, if UE 115-*a* does not receive a new indication after 'M,' UE 115-*a* may use the inter-TTI bitmap for SRS transmissions cyclically over the next 'M' SRS occasions or over the next 'M' time slots or over the next 'M' time units.

Based on SRS configuration 210 and inter-TTI bitmap indication 215, UE 115-*a* may transmit SRS(s) 220 with repetition and inter-slot (or intra-slot) frequency hopping according to the indicated inter-TTI bitmap. For example, a repetition for different hops may be different based on the inter-TTI bitmap (e.g., a different bitmap per each hop). In some examples, the techniques described herein for transmitting SRS(s) 220 according to the inter-TTI bitmap may be considered as per subband (e.g., or on a frequency hop basis) and may be extended to all frequency hops.

In some examples, base station 105-*a* may also indicate an intra-slot bitmap to UE 115-*a* for intra-slot repetitions, where per TTI (e.g., slot), the intra-slot bitmap may indicate which repetition in an intra-slot repetition is used by UE 115-*a* for transmitting SRS(s) 220. For example, the intra-slot bitmap may be configured per SRS resource. Additionally, UE 115-*a* may apply the intra-slot bitmap to on or active TTIs as indicated by a master bitmap, such as the inter-TTI bitmap (e.g., those TTIs for which UE 115-*a* has been indicated to transmit SRS(s) 220). For example, assuming an inter-TTI repetition is four (4) and the inter-TTI bitmap is (1,0,1,0), UE 115-*a* may not transmit SRS(s) in the second and fourth TTIs (e.g., based on the corresponding '0' for each TTI in the inter-TTI bitmap) and may transmit SRS(s) 220 in the first and third TTIs based on the intra-slot bitmap which indicates which symbols within each repetition are used. In some examples, each TTI (e.g., slot) may have a corresponding intra-slot repetition bitmap (e.g., which indicates the on or used SRS symbols within an intra-slot repetition).

Figure 3:
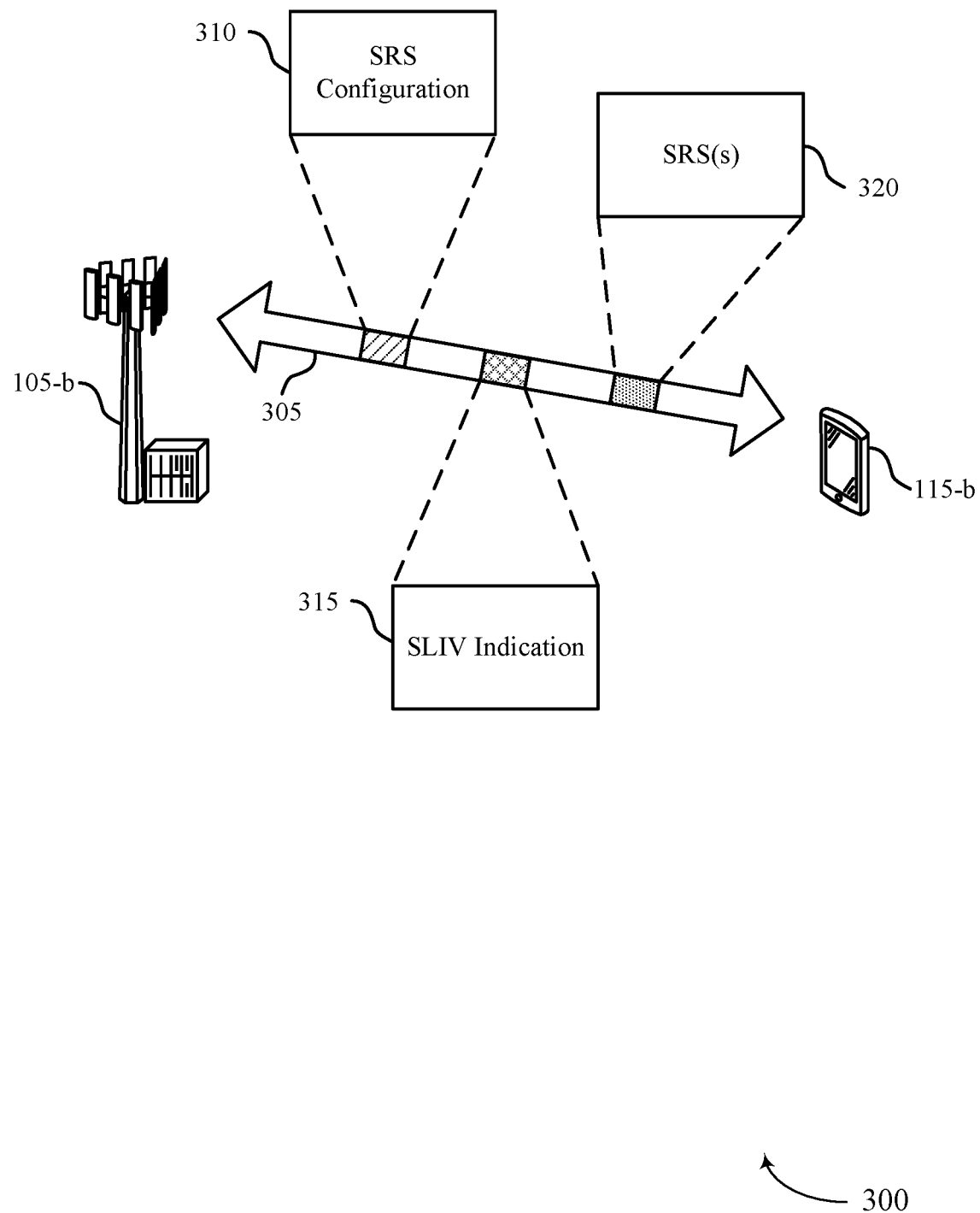

FIG. 3 illustrates an example of a wireless communications system 300 that supports managing SRS repetitions through DCI in accordance with aspects of the present disclosure. In some examples, wireless communications system 300 may implement aspects of or may be implemented by aspects of wireless communications system 100, wireless communications system 200, or both. For example, wireless communications system 300 may include a base station 105-*b* and a UE 115-*b*, which may represent examples of corresponding base stations 105 and UEs 115, respectively, as described with reference to FIGS. 1-2. Additionally, base station 105-b and UE 115-b may communicate control information, data, or both using resources of a carrier 305.

As described previously with reference to FIG. 2, base station 105-b may transmit an SRS configuration 310 to UE 115-b to indicate different parameters to enable UE 115-b to transmit one or more SRSs 320 to base station 105-b. For example, SRS configuration 310 may include, among other parameters, resource mapping information for the transmission of SRS(s) 320, such as an indication of a starting position, a number of symbols, and a repetition factor (e.g., a length of the SRS transmissions) for the SRS transmissions (e.g., one (1), two (2), or four (4) repetitions per slot/TTI). However, similar to the issues that may arise from using an SRS configuration for SRS transmissions as described with reference to FIG. 2, the starting position and number of symbols indicated for the SRS transmissions in SRS configuration 310 may be inefficient or non-optimal for one or more given SRS transmissions.

As such, base station 105-b may transmit a SLIV indication 315 (e.g., a SLIV-like configuration) per SRS resource or SRS resource set that indicates a starting location and length for the corresponding SRS resource or SRS resource set for UE 115-b to transmit SRS(s) 320. For example, the starting location (e.g., a start symbol) indicated in SLIV indication 315 may be an offset from the starting position indicated in SRS configuration 310 (e.g., RRC configured starting position). In some examples, this offset idea may be applied for SRS resource sets because all SRS resources within the SRS resource set will be shifted. Additionally or alternatively, the starting location indicated in SLIV indication 315 may be used to override the starting position indicated in SRS configuration 310. Additionally, the starting location for the SRS resource/SRS resource set may be the same across inter-slot repetitions or may be different, so a list of starting locations may be defined in DCI, where SLIV indication 315 indicates one of the starting locations from the list.

In some examples, a length for the SRS resource/SRS resource set indicated in SLIV indication 315 may be used to indicate and override a length value indicated in SRS configuration 310 (e.g., an RRC configured repetition factor in intra-slot). The repetition (e.g., length signaled in DCI) may also be different from one inter-slot repetition to the other inter-slot repetitions. Additionally or alternatively, base station 105-a may define a length value as 'invalid' or negative to indicate for UE 115-b to fallback to the repetition factor included in SRS configuration 310 (e.g., RRC configured repetition factor). Accordingly, base station 105-b may use SLIV indication 315 to configure any given SRS resources or SRS resource sets under consideration. In some examples, base station 105-b may configure starting location and length pairs (e.g., (S,L) pairs) in tables via RRC/MAC-CE and may signal one of the starting location and length pairs for UE 115-b to use for transmitting SRS(s) 320 in DCI. Additionally, in the DCI, base station 105-b may indicate different starting location and length pairs for each TTI across a configured inter-TTI repetition from SRS configuration 310.

Figure 4A:
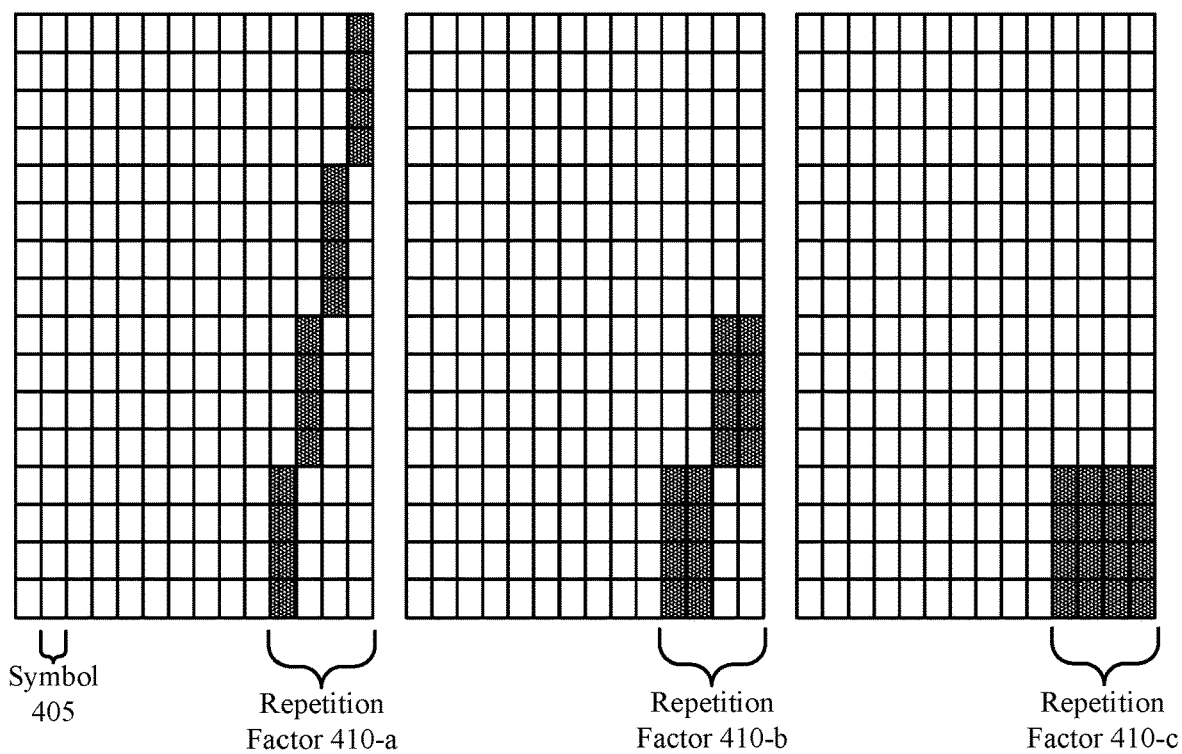
FIGS. 4A and 4B illustrate examples of SRS repetition configurations in accordance with aspects of the present disclosure.
Figure 4B:
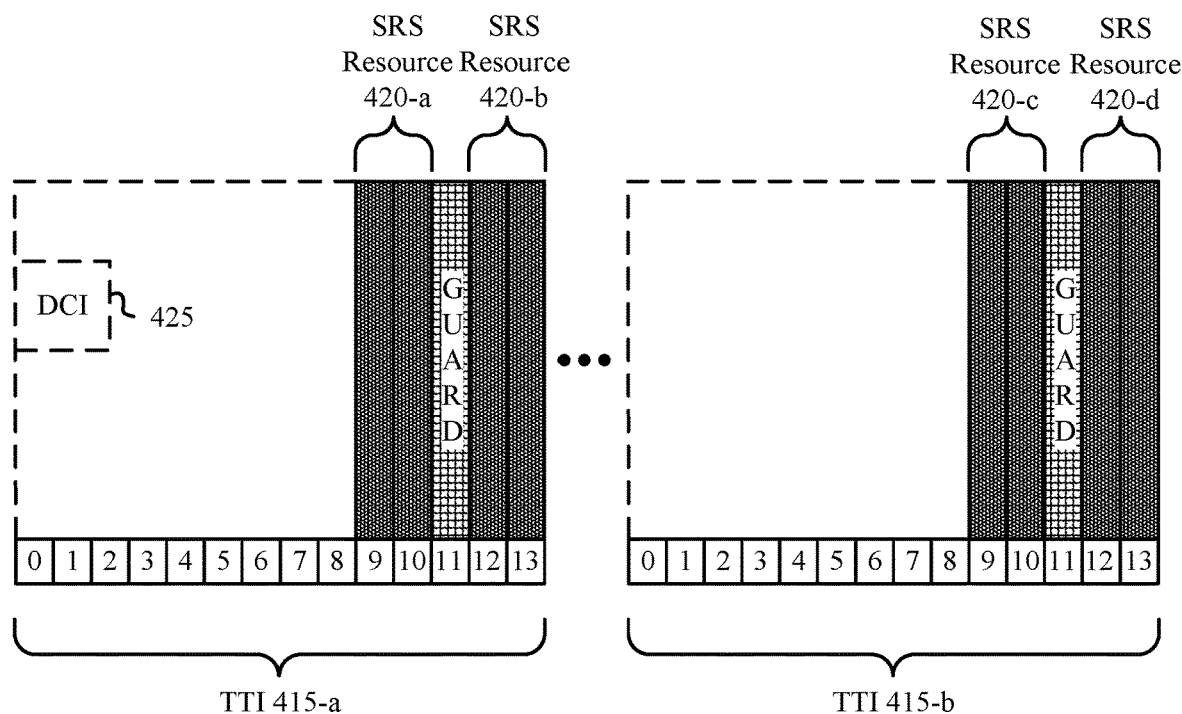

FIGS. 4A and 4B illustrate examples of an SRS repetition configuration 400 and an SRS repetition configuration 401, respectively, in accordance with aspects of the present disclosure. In some examples, SRS repetition configuration 400 and SRS repetition configuration 401 may implement aspects of or may be implemented by aspects of wireless communications system 100, wireless communications system 200, wireless communications system 300, or a combination thereof. For example, a base station 105 may configure a UE 115 to transmit one or more SRSs to the base station 105 according to SRS repetition configuration 400 (e.g., intra-TTI or intra-slot SRS repetitions), SRS repetition configuration 401 (e.g., inter-TTI or inter-slot SRS repetitions), or both.

SRS repetition configuration 400 may represent an SRS repetition configured for an SRS resource within a slot (e.g., within a TTI). For example, as described previously with reference to FIGS. 2 and 3, the base station 105 may configure (e.g., via RRC or MAC-CE) the UE 115 with a repetition factor for each SRS resource, where the repetition factor can be one (1), two (2), or four (4). As shown in the example of FIG. 4A, the base station 105 may configure an SRS resource with four (4) symbols 405 and different possible repetition factors 410. For example, a first repetition factor 410-a may include a value of one (1), where four (4) SRSs are transmitted in one (1) symbol 405 each (e.g., a 1× repetition configuration). Additionally or alternatively, a second repetition factor 410-b may include a value of two (2), where two (2) SRSs are transmitted in two (2) symbols 405 each (e.g., a 2× repetition configuration). Additionally or alternatively, a third repetition factor 410-c may include a value of four (4), where one (1) SRS is transmitted across four (4) symbols 405 (e.g., a 4× repetition configuration).

SRS repetition configuration 401 may represent a configuration that includes each SRS resource that is repeated two (2) times per slot or TTI (e.g., intra-TTI or intra-slot repetition) with an inter-TTI repetition of 'K.' For example, the base station 105 may configure the UE 115 to transmit SRSs on a first SRS resource 420-a and a second SRS resource 420-b with a repetition factor of two (2) in a first TTI 415-a (e.g., intra-slot repetition). Additionally, the base station 105 may also configure the UE 115 to transmit SRSs on a third SRS resource 420-c and a fourth SRS resource 420-d with a same repetition factor of two (2) in a second TTI 415-b (e.g., inter-TTI or inter-slot repetition) that is 'K' TTIs after first TTI 415-a (e.g., K≥1). As described with reference to FIG. 3, the base station 105 may transmit a SLIV-like indication or configuration to UE 115 to indicate a starting location for SRS resources within a TTI and a length of the SRS resource (e.g., repetition factor). For example, the base station 105 may transmit a DCI 425 that indicates at least a first starting location (e.g., S1) for first SRS resource 420-a. In some examples, DCI 425 may also include a second starting location for third SRS resource 420-c that can be equal or different from the first starting location (e.g., same or different across inter-slot repetitions).

Figure 5:
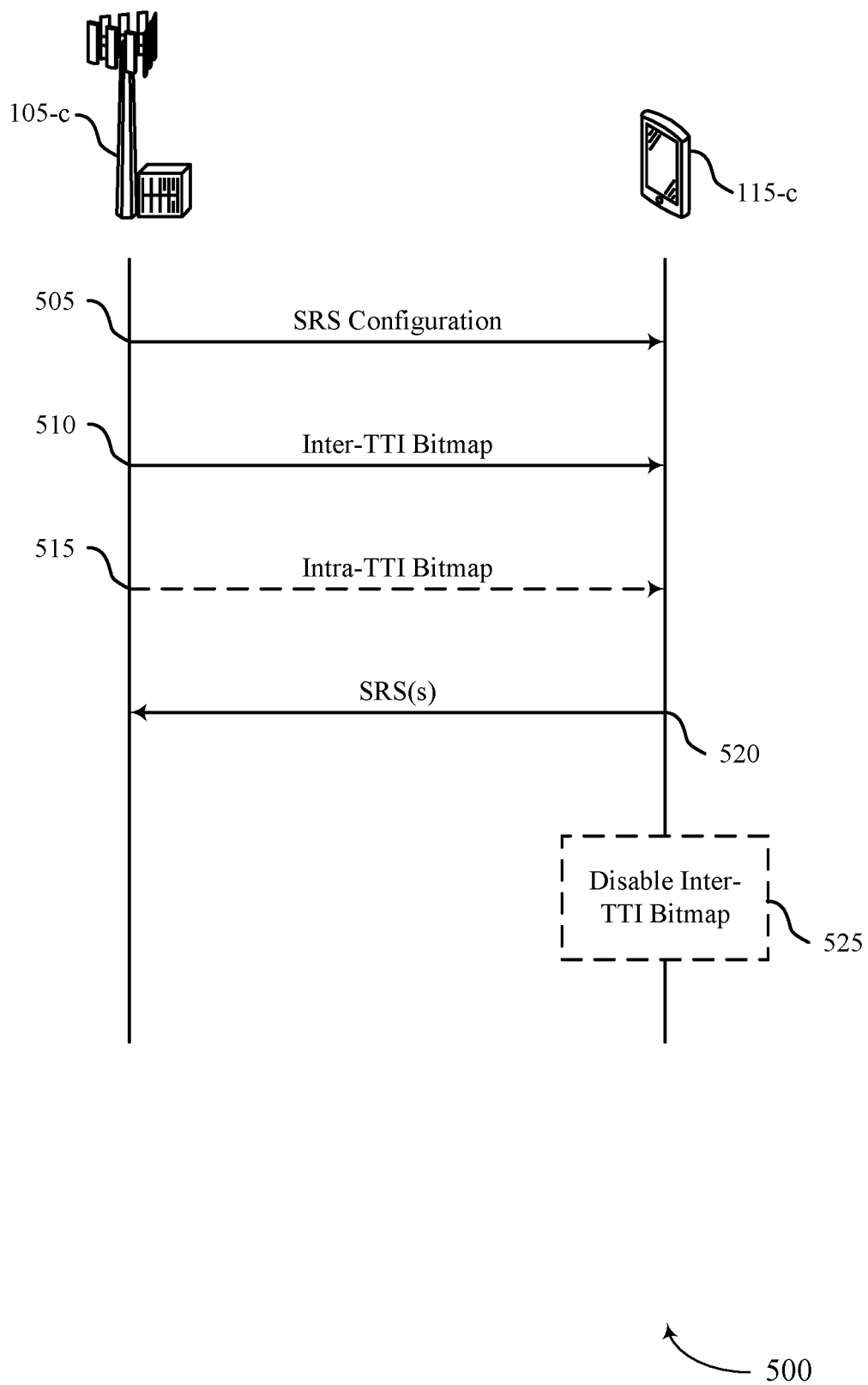
FIGS. 5 and 6 illustrate examples of process flows in accordance with aspects of the present disclosure.

FIG. 5 illustrates an example of a process flow 500 that supports managing SRS repetitions through DCI in accordance with aspects of the present disclosure. In some examples, process flow 500 may implement aspects of or may be implemented by aspects of wireless communications system 100, wireless communications system 200, or both. For example, process flow 500 may include a base station 105-c and a UE 115-c, which may represent examples of corresponding base stations 105 and UEs 115, respectively, as described with reference to FIGS. 1-4B.

In the following description of process flow 500, the operations between UE 115-c and base station 105-c may be performed in different orders or at different times. Certain operations may also be left out of process flow 500, or other operations may be added to process flow 500. It is to be understood that while UE 115-c and base station 105-c are shown performing a number of the operations of process flow 500, any wireless device may perform the operations shown.

At 505, UE 115-*c* may receive, from base station 105-*c*, control signaling indicating an SRS configuration identifying a set of TTIs configured for SRS transmission. In some examples, UE 115-*c* may receive the control signaling including a parameter indicating a size of an inter-TTI bitmap (e.g., 'M' as described with reference to FIG. 2).

At 510, UE 115-*c* may receive, based on the SRS configuration, a control message indicating an inter-TTI bitmap that identifies a subset of the set of TTIs. In some examples, a size of the inter-TTI bitmap may correspond to a number of repetitions configured for SRS transmission across the set of TTIs, to a window size configured for SRS transmission, or a combination thereof. For example, UE 115-*c* may receive the inter-TTI bitmap including a set of bits, where each bit of the set of bits represents a respective TTI of the set of TTIs. Additionally, UE 115-*c* may receive the control message indicating for UE 115-*c* to transmit the SRS via a specific SRS resource in each of the subset of the set of TTIs, via each SRS of an SRS resource set in each of the subset of the set of TTIs, via all SRS resources configured in each of the subset of the set of TTIs, or a combination thereof. In some examples, UE 115-*c* may receive the control signaling indicating a set of inter-TTI bitmaps, where the control message indicates the inter-TTI bitmap from the set of inter-TTI bitmaps.

Additionally, UE 115-*c* may receive the control message including an activation message indicating for UE 115-*c* to use the inter-TTI bitmap. In some examples, UE 115-*c* may receive the control message indicating the inter-TTI bitmap that identifies the subset of the set of TTIs corresponds to a frequency hop of a set of frequency hops, where the SRS is transmitted at the frequency hop in accordance with the inter-TTI bitmap.

At 515, UE 115-*c* may receive the control message indicating one or more intra-TTI bitmaps identifying one or more subintervals in each of the subset of the set of TTIs, where the SRS is transmitted in the one or more subintervals in the subset of the set of TTIs based on the one or more intra-TTI bitmaps. For example, UE 115-*c* may receive a single intra-TTI bitmap that is used for each of the set of TTIs. Additionally or alternatively, UE 115-*c* may receive the control message or a second control message indicating a set of intra-TTI bitmaps, where each of the set of intra-TTI bitmaps corresponds to a respective TTI of the set of TTIs. In some examples, the one or more intra-TTI bitmaps may be configured per SRS resource.

At 520, UE 115-*c* may transmit, to base station 105-*c*, an SRS in the subset of the set of TTIs in accordance with the inter-TTI bitmap. In some examples, UE 115-*c* may transmit the SRS for one or more SRS occasions after the set of TTIs ends, where a number of the one or more SRS occasions corresponds to a size of the inter-TTI bitmap. Additionally or alternatively, at 525, UE 115-*c* may disable the inter-TTI bitmap after the set of TTIs ends.

Figure 6:
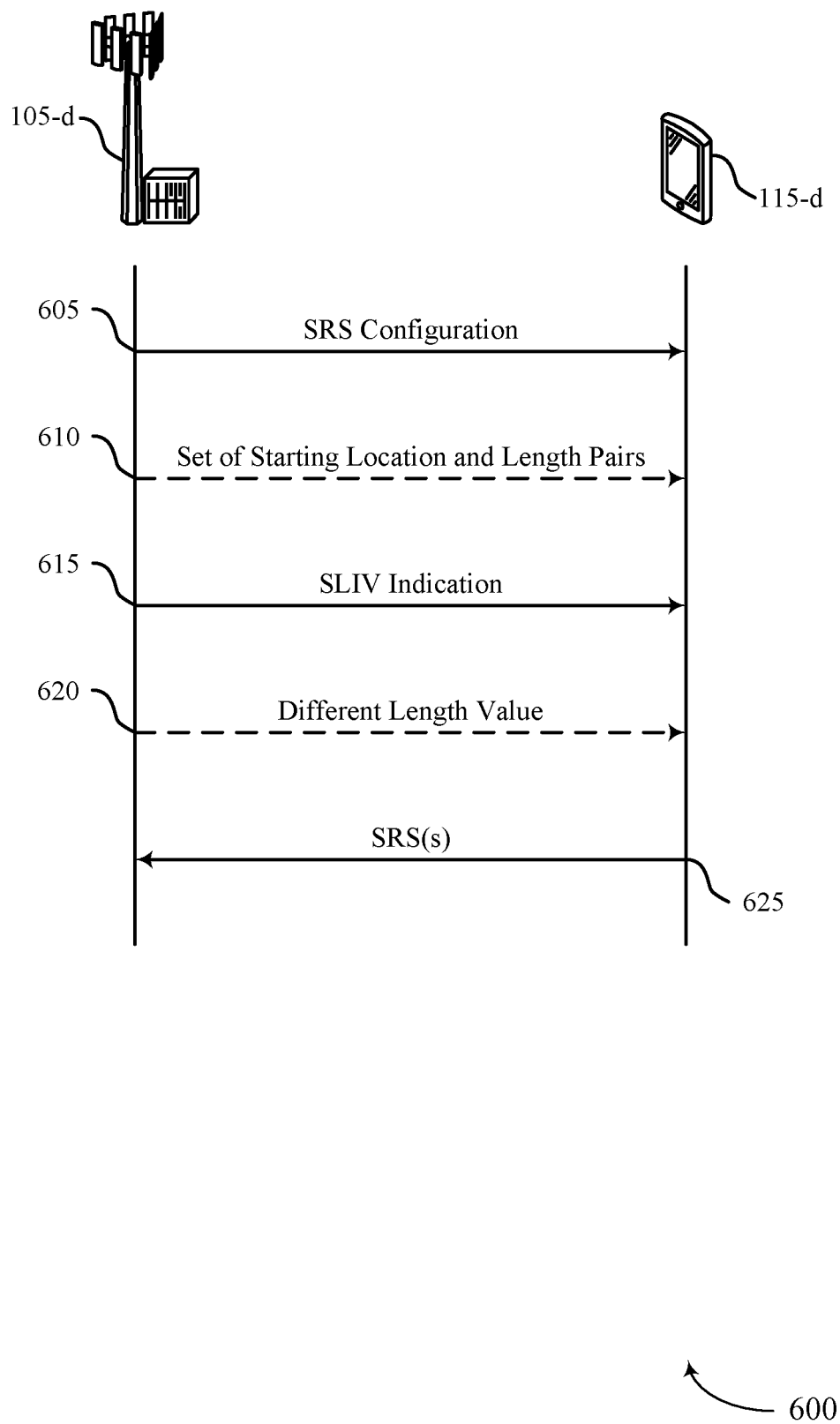

FIG. 6 illustrates an example of a process flow 600 that supports managing SRS repetitions through DCI in accordance with aspects of the present disclosure. In some examples, process flow 600 may implement aspects of or may be implemented by aspects of wireless communications system 100, wireless communications system 300, or both. For example, process flow 600 may include a base station 105-*d* and a UE 115-*d*, which may represent examples of corresponding base stations 105 and UEs 115, respectively, as described with reference to FIGS. 1-5.

In the following description of process flow 600, the operations between UE 115-*d* and base station 105-*d* may be performed in different orders or at different times. Certain operations may also be left out of process flow 600, or other operations may be added to process flow 600. It is to be understood that while UE 115-*d* and base station 105-*d* are shown performing a number of the operations of process flow 600, any wireless device may perform the operations shown.

At 605, UE 115-*d* may receive control signaling indicating an SRS configuration identifying a set of TTIs configured for SRS transmission. For example, the SRS configuration may include, among other parameters, resource mapping information for the SRS transmission, such as an indication of a starting position, a number of symbols, and a repetition factor (e.g., a length of the SRS transmission) for the SRS transmissions (e.g., one (1), two (2), or four (4) repetitions per slot/TTI), as well as a resource type that may indicate inter-TTI repetition factor for indicating a number of TTIs to transmit the SRS(s) and how often to transmit the SRS(s).

At 610, UE 115-*d* may receive a set of starting location and length pairs configured for SRS transmission, where a control message indicates an individual starting location and length pair of the set of starting location and length pairs. In some examples, a same or different starting location and length pair may be indicated for each of the set of TTIs (e.g., starting location and length pairs may differ per TTI of an inter-TTI repetition configuration).

At 615, UE 115-*d* may receive, based on the SRS configuration, a control message indicating a starting location of an SRS transmission and a length of the SRS transmission within a first TTI of the set of TTIs. For example, UE 115-*d* may receive the control message per SRS resource or per SRS resource set. In some examples, UE 115-*d* may receive the control message indicating the starting location as an offset value from a previously configured starting location. Additionally or alternatively, UE 115-*d* may receive the control message indicating a set of starting locations, where each starting location of the set of starting locations is configured for a respective TTI of the set of TTIs and where the set of starting locations includes the starting location of the SRS transmission within the first TTI.

In some examples, UE 115-*d* may receive the control message indicating the length of the SRS transmission within the first TTI that overrides a previously configured repetition factor for the SRS transmission. Additionally or alternatively, UE 115-*d* may receive the control message indicating a set of lengths, where each length of the set of lengths is configured for a respective TTI of the set of TTIs where the set of lengths includes the length of the SRS transmission within the first TTI.

At 620, UE 115-*d* may receive an additional control message indicating a different value for the length of the SRS transmission, where a previously configured repetition factor for the SRS transmission is used (e.g., from the SRS configuration) based on the additional control message indicating the different value for the length. In some examples, the different value for the length may include an invalid value or a negative value.

At 625, UE 115-*d* may transmit, to base station 105-*d*, an SRS in the first TTI in accordance with the control message. For example, UE 115-*d* may transmit the SRS in the first TTI based on the starting location of the SRS transmission and the length of the SRS transmission included in the control message.

Figure 7:
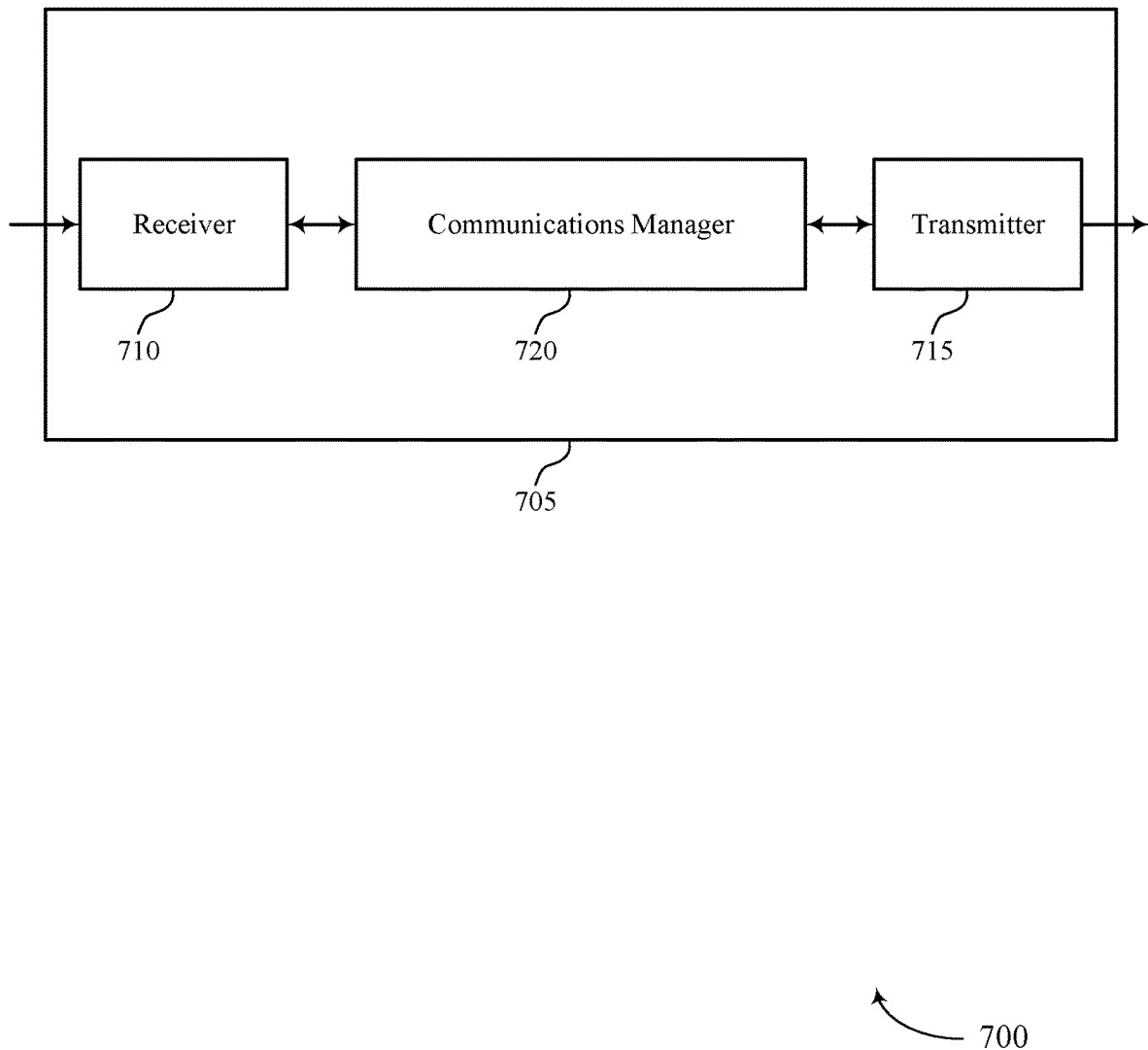
FIGS. 7 and 8 show block diagrams of devices in accordance with aspects of the present disclosure.

FIG. 7 shows a block diagram 700 of a device 705 that supports managing SRS repetitions through DCI in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to managing SRS repetitions through DCI). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to managing SRS repetitions through DCI). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of managing SRS repetitions through DCI as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. For example, the communications manager 720 may be configured as or otherwise support a means for receiving, from a base station, control signaling indicating an SRS configuration identifying a set of multiple TTIs configured for SRS transmission. The communications manager 720 may be configured as or otherwise support a means for receiving, based on the SRS configuration, a control message indicating an inter-TTI bitmap that identifies a subset of the set of multiple TTIs. The communications manager 720 may be configured as or otherwise support a means for transmitting, to the base station, an SRS in the subset of the set of multiple TTIs in accordance with the inter-TTI bitmap.

Additionally or alternatively, the communications manager 720 may support wireless communications at a UE in accordance with examples as disclosed herein. For example, the communications manager 720 may be configured as or otherwise support a means for receiving control signaling indicating an SRS configuration identifying a set of multiple TTIs configured for SRS transmission. The communications manager 720 may be configured as or otherwise support a means for receiving, based on the SRS configuration, a control message indicating a starting location of an SRS transmission and a length of the SRS transmission within a first TTI of the set of multiple TTIs. The communications manager 720 may be configured as or otherwise support a means for transmitting, to a base station, an SRS in the first TTI in accordance with the control message.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for reduced power consumption. For example, based on the control message indicating the inter-TTI bitmap or the starting location and length of an SRS transmission, the device 705 may transmit SRSs using dynamic indications rather than semi-static configurations which may include parameters that are no longer optimal for SRS transmissions. As such, the device 705 may save power by not having to attempt to transmit the SRSs using the semi-static configurations and/or by using antenna switching. Additionally, the dynamic indications may reduce interference between devices, which may also help the device 705 save power by decreasing the chances of interference and having to retransmit the SRSs.

Figure 8:
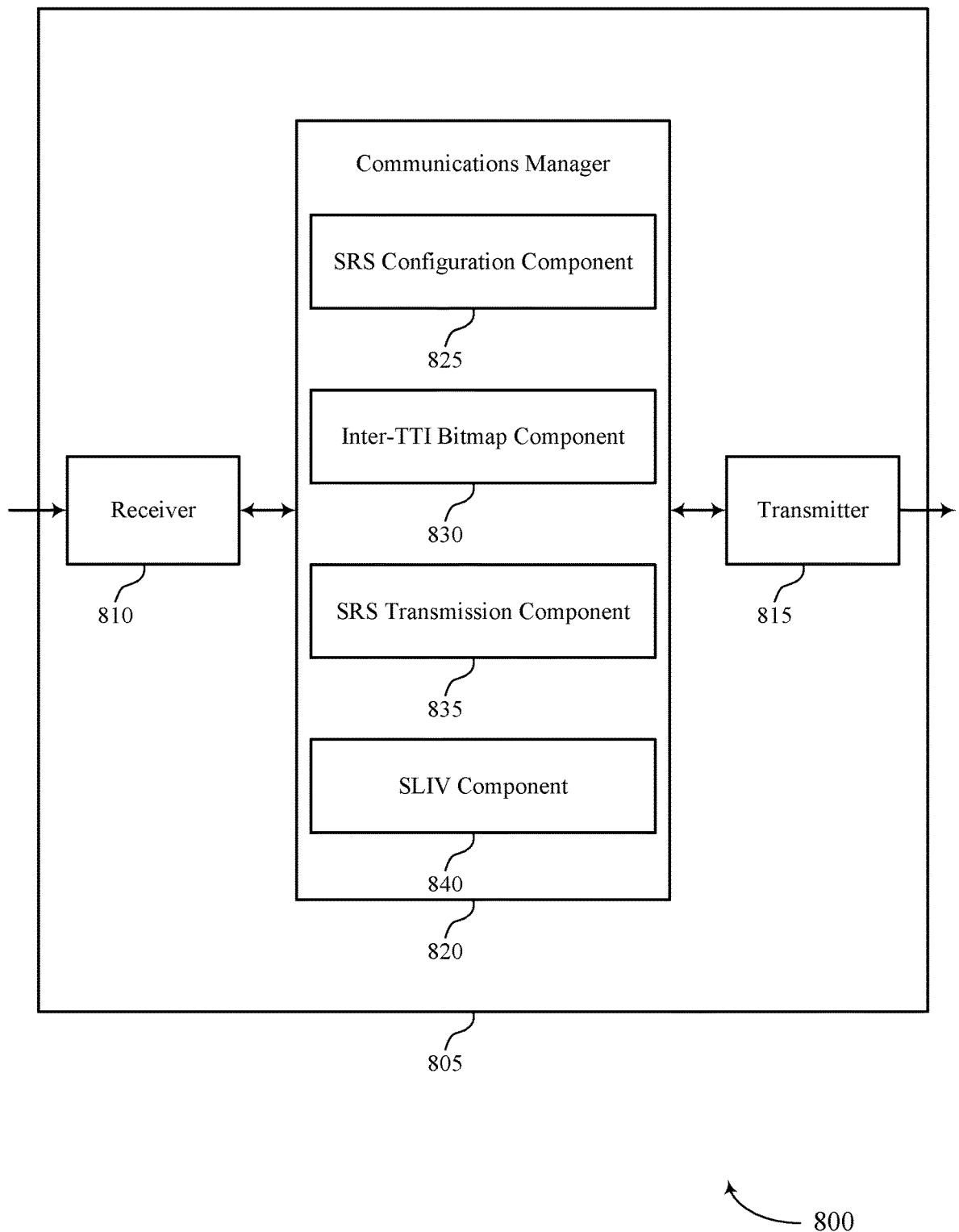

FIG. 8 shows a block diagram 800 of a device 805 that supports managing SRS repetitions through DCI in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to managing SRS repetitions through DCI). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to managing SRS repetitions through DCI). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of managing SRS repetitions through DCI as described herein. For example, the communications manager 820 may include an SRS configuration component 825, an inter-TTI bitmap component 830, an SRS transmission component 835, an SLIV component 840, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a UE in accordance with examples as disclosed herein. The SRS configuration component 825 may be configured as or otherwise support a means for receiving, from a base station, control signaling indicating an SRS configuration identifying a set of multiple TTIs configured for SRS transmission. The inter-TTI bitmap component 830 may be configured as or otherwise support a means for receiving, based on the SRS configuration, a control message indicating an inter-TTI bitmap that identifies a subset of the set of multiple TTIs. The SRS transmission component 835 may be configured as or otherwise support a means for transmitting, to the base station, an SRS in the subset of the set of multiple TTIs in accordance with the inter-TTI bitmap.

Additionally or alternatively, the communications manager 820 may support wireless communications at a UE in accordance with examples as disclosed herein. The SRS configuration component 825 may be configured as or otherwise support a means for receiving control signaling indicating an SRS configuration identifying a set of multiple TTIs configured for SRS transmission. The SLIV component 840 may be configured as or otherwise support a means for receiving, based on the SRS configuration, a control message indicating a starting location of an SRS transmission and a length of the SRS transmission within a first TTI of the set of multiple TTIs. The SRS transmission component 835 may be configured as or otherwise support a means for transmitting, to a base station, an SRS in the first TTI in accordance with the control message.

Figure 9:
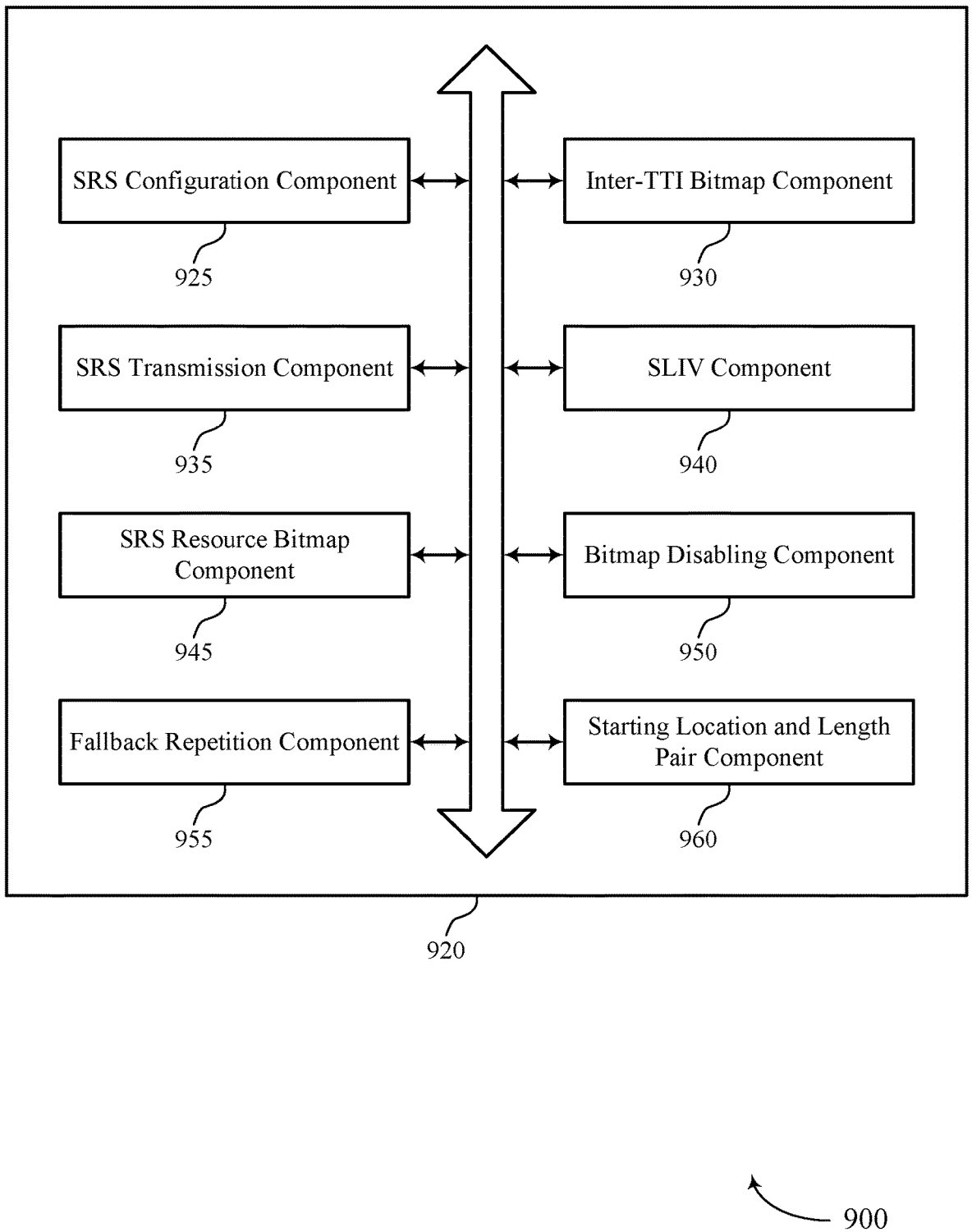
FIG. 9 shows a block diagram of a communications manager in accordance with aspects of the present disclosure.

FIG. 9 shows a block diagram 900 of a communications manager 920 that supports managing SRS repetitions through DCI in accordance with aspects of the present disclosure. The communications manager 920 may be an example of aspects of a communications manager 720, a communications manager 820, or both, as described herein. The communications manager 920, or various components thereof, may be an example of means for performing various aspects of managing SRS repetitions through DCI as described herein. For example, the communications manager 920 may include an SRS configuration component 925, an inter-TTI bitmap component 930, an SRS transmission component 935, an SLIV component 940, an SRS resource bitmap component 945, a bitmap disabling component 950, a fallback repetition component 955, a starting location and length pair component 960, or any combination thereof. Each of these components may communicate, directly or indirectly, with one another (e.g., via one or more buses).

The communications manager 920 may support wireless communications at a UE in accordance with examples as disclosed herein. The SRS configuration component 925 may be configured as or otherwise support a means for receiving, from a base station, control signaling indicating an SRS configuration identifying a set of multiple TTIs configured for SRS transmission. The inter-TTI bitmap component 930 may be configured as or otherwise support a means for receiving, based on the SRS configuration, a control message indicating an inter-TTI bitmap that identifies a subset of the set of multiple TTIs. The SRS transmission component 935 may be configured as or otherwise support a means for transmitting, to the base station, an SRS in the subset of the set of multiple TTIs in accordance with the inter-TTI bitmap.

In some examples, to support receiving the control message indicating the inter-TTI bitmap, the inter-TTI bitmap component 930 may be configured as or otherwise support a means for receiving the inter-TTI bitmap including a set of multiple bits, each bit of the set of multiple bits representing a respective TTI of the set of multiple TTIs.

In some examples, to support receiving the control message, the inter-TTI bitmap component 930 may be configured as or otherwise support a means for receiving the control message indicating for the UE to transmit the SRS via a specific SRS resource in each of the subset of the set of multiple TTIs, via each SRS of an SRS resource set in each of the subset of the set of multiple TTIs, via all SRS resources configured in each of the subset of the set of multiple TTIs, or a combination thereof.

In some examples, to support receiving the control signaling indicating the SRS configuration, the SRS configuration component 925 may be configured as or otherwise support a means for receiving the control signaling including a parameter indicating a size of the inter-TTI bitmap.

In some examples, to support receiving the control signaling indicating the SRS configuration, the SRS configuration component 925 may be configured as or otherwise support a means for receiving the control signaling indicating a set of multiple inter-TTI bitmaps, where the control message indicates the inter-TTI bitmap from the set of multiple inter-TTI bitmaps.

In some examples, to support receiving the control message, the inter-TTI bitmap component 930 may be configured as or otherwise support a means for receiving the control message including an activation message indicating for the UE to use the inter-TTI bitmap.

In some examples, to support transmitting the SRS, the SRS transmission component 935 may be configured as or otherwise support a means for transmitting the SRS for one or more SRS occasions after the set of multiple TTIs ends, where a number of the one or more SRS occasions corresponds to a size of the inter-TTI bitmap.

In some examples, to support receiving the control message indicating the inter-TTI bitmap, the inter-TTI bitmap component 930 may be configured as or otherwise support a means for receiving the control message indicating the inter-TTI bitmap that identifies the subset of the set of multiple TTIs corresponds to a frequency hop of a set of multiple frequency hops, where the SRS is transmitted at the frequency hop in accordance with the inter-TTI bitmap.

In some examples, to support receiving the control message, the SRS resource bitmap component 945 may be configured as or otherwise support a means for receiving the control message indicating one or more intra-TTI bitmaps identifying one or more subintervals in each of the subset of the set of multiple TTIs, where the SRS is transmitted in the one or more subintervals in the subset of the set of multiple TTIs based on the one or more intra-TTI bitmaps.

In some examples, to support receiving the control message, the SRS resource bitmap component 945 may be configured as or otherwise support a means for receiving a single intra-TTI bitmap that is used for each of the set of multiple TTIs.

In some examples, the SRS resource bitmap component 945 may be configured as or otherwise support a means for receiving the control message or a second control message indicating a set of multiple intra-TTI bitmaps, each of the set of multiple intra-TTI bitmaps corresponding to a respective TTI of the set of multiple TTIs.

In some examples, the one or more intra-TTI bitmaps are configured per SRS resource.

In some examples, the bitmap disabling component 950 may be configured as or otherwise support a means for disabling the inter-TTI bitmap after the set of multiple TTIs ends.

In some examples, a size of the inter-TTI bitmap corresponds to a number of repetitions configured for SRS transmission across the set of multiple TTIs, to a window size configured for SRS transmission, or a combination thereof.

Additionally or alternatively, the communications manager 920 may support wireless communications at a UE in accordance with examples as disclosed herein. In some examples, the SRS configuration component 925 may be configured as or otherwise support a means for receiving control signaling indicating an SRS configuration identifying a set of multiple TTIs configured for SRS transmission. The SLIV component 940 may be configured as or otherwise support a means for receiving, based on the SRS configuration, a control message indicating a starting location of an SRS transmission and a length of the SRS transmission within a first TTI of the set of multiple TTIs. In some examples, the SRS transmission component 935 may be configured as or otherwise support a means for transmitting, to a base station, an SRS in the first TTI in accordance with the control message.

In some examples, to support receiving the control message, the SLIV component 940 may be configured as or otherwise support a means for receiving the control message indicating the starting location as an offset value from a previously configured starting location.

In some examples, to support receiving the control message, the SLIV component 940 may be configured as or otherwise support a means for receiving the control message indicating a set of multiple starting locations, each starting location of the set of multiple starting locations configured for a respective TTI of the set of multiple TTIs, where the set of multiple starting locations includes the starting location of the SRS transmission within the first TTI.

In some examples, to support receiving the control message, the SLIV component 940 may be configured as or otherwise support a means for receiving the control message indicating the length of the SRS transmission within the first TTI that overrides a previously configured repetition factor for the SRS transmission.

In some examples, to support receiving the control message, the SLIV component 940 may be configured as or otherwise support a means for receiving the control message indicating a set of multiple lengths, each length of the set of multiple lengths configured for a respective TTI of the set of multiple TTIs, where the set of multiple lengths includes the length of the SRS transmission within the first TTI.

In some examples, the fallback repetition component 955 may be configured as or otherwise support a means for receiving an additional control message indicating a different value for the length of the SRS transmission, where a previously configured repetition factor for the SRS transmission is used based on the additional control message indicating the different value for the length.

In some examples, the different value for the length includes an invalid value or a negative value.

In some examples, the starting location and length pair component 960 may be configured as or otherwise support a means for receiving a set of multiple starting location and length pairs configured for SRS transmission, where the control message indicates an individual starting location and length pair of the set of multiple starting location and length pairs.

In some examples, a same or different starting location and length pair is indicated for each of the set of multiple TTIs.

In some examples, to support receiving the control message, the SLIV component 940 may be configured as or otherwise support a means for receiving the control message per SRS resource or per SRS resource set.

Figure 10:
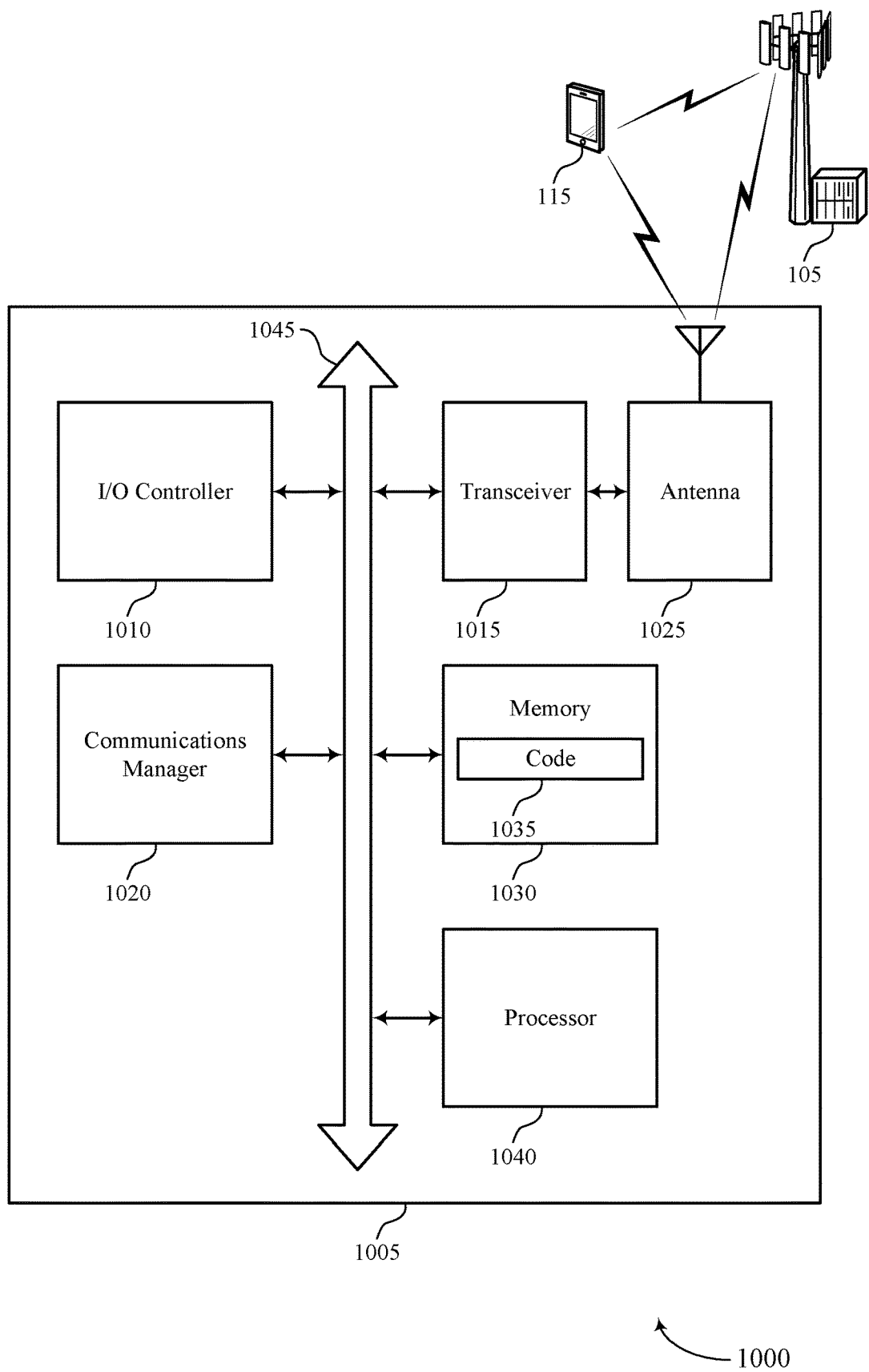
FIG. 10 shows a diagram of a system including a device in accordance with aspects of the present disclosure.

FIG. 10 shows a diagram of a system 1000 including a device 1005 that supports managing SRS repetitions through DCI in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting managing SRS repetitions through DCI). For example, the device 1005 or a component of the device 1005 may include a processor 1040 and memory 1030 coupled to the processor 1040, the processor 1040 and memory 1030 configured to perform various functions described herein.

The communications manager 1020 may support wireless communications at a UE in accordance with examples as disclosed herein. For example, the communications manager 1020 may be configured as or otherwise support a means for receiving, from a base station, control signaling indicating an SRS configuration identifying a set of multiple TTIs configured for SRS transmission. The communications manager 1020 may be configured as or otherwise support a means for receiving, based on the SRS configuration, a control message indicating an inter-TTI bitmap that identifies a subset of the set of multiple TTIs. The communications manager 1020 may be configured as or otherwise support a means for transmitting, to the base station, an SRS in the subset of the set of multiple TTIs in accordance with the inter-TTI bitmap.

Additionally or alternatively, the communications manager 1020 may support wireless communications at a UE in accordance with examples as disclosed herein. For example, the communications manager 1020 may be configured as or otherwise support a means for receiving control signaling indicating an SRS configuration identifying a set of multiple TTIs configured for SRS transmission. The communications manager 1020 may be configured as or otherwise support a means for receiving, based on the SRS configuration, a control message indicating a starting location of an SRS transmission and a length of the SRS transmission within a first TTI of the set of multiple TTIs. The communications manager 1020 may be configured as or otherwise support a means for transmitting, to a base station, an SRS in the first TTI in accordance with the control message.

By including or configuring the communications manager 1020 in accordance with examples as described herein, the device 1005 may support techniques for improved communication reliability and reduced power consumption. For example, based on the control message indicating the inter-TTI bitmap or the starting location and length of an SRS transmission, the device 1005 may transmit SRSs using dynamic indications rather than semi-static configurations which may include parameters that are no longer optimal for SRS transmissions. As such, the device 1005 may save power by not having to attempt to transmit the SRSs using the semi-static configurations and/or by using antenna switching. Additionally, the dynamic indications may reduce interference between devices, which may also help the device 1005 save power and improve communication reliability of transmitting the SRSs by decreasing the chances of interference and having to retransmit the SRSs.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of managing SRS repetitions through DCI as described herein, or the processor 1040 and the memory 1030 may be otherwise configured to perform or support such operations.

Figure 11:
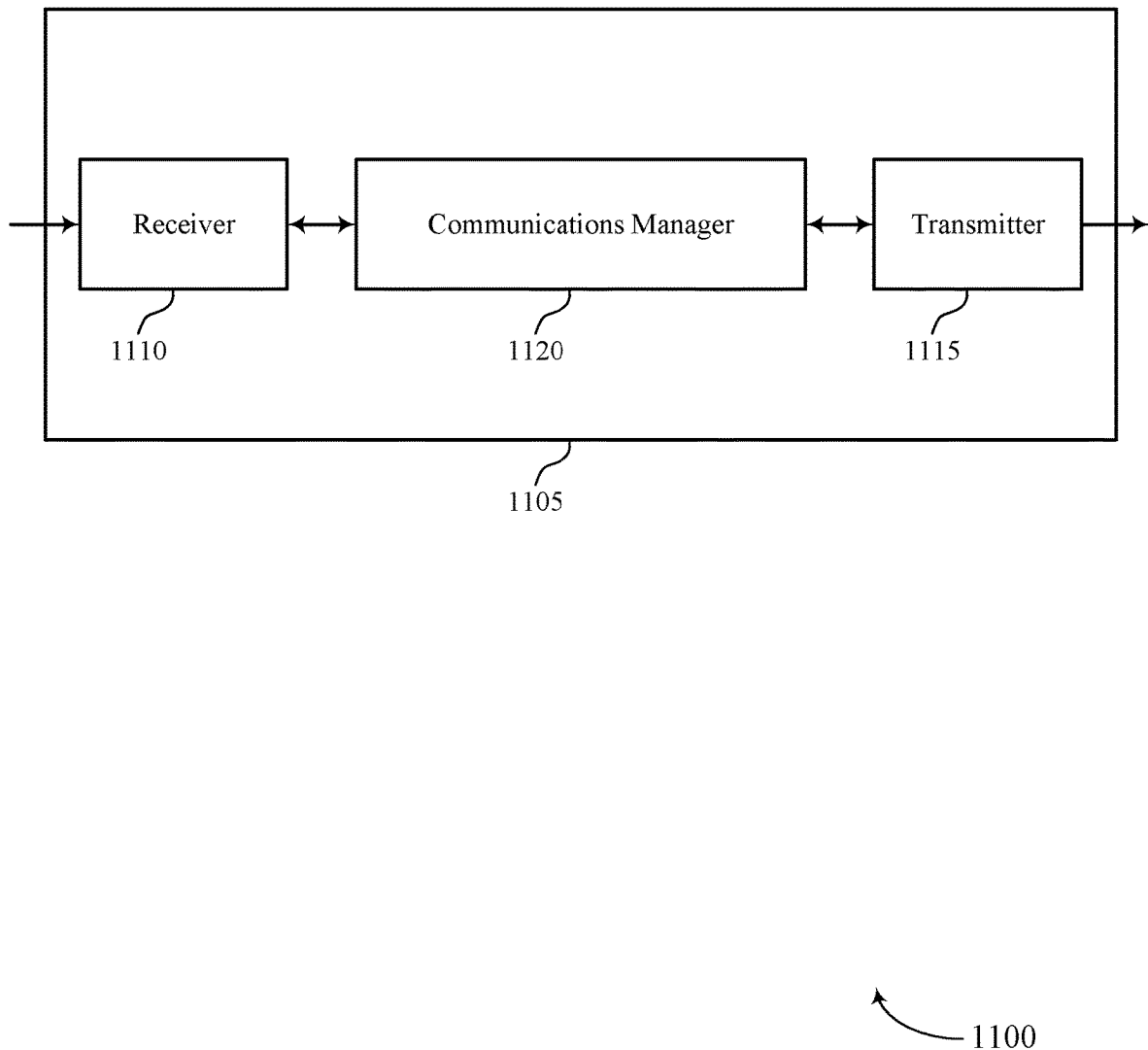
FIGS. 11 and 12 show block diagrams of devices in accordance with aspects of the present disclosure.

FIG. 11 shows a block diagram 1100 of a device 1105 that supports managing SRS repetitions through DCI in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to managing SRS repetitions through DCI). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to managing SRS repetitions through DCI). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of managing SRS repetitions through DCI as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a base station in accordance with examples as disclosed herein. For example, the communications manager 1120 may be configured as or otherwise support a means for transmitting, to a UE, control signaling indicating an SRS configuration identifying a set of multiple TTIs configured for SRS transmission. The communications manager 1120 may be configured as or otherwise support a means for transmitting, to the UE based on the SRS configuration, a control message indicating an inter-TTI bitmap that identifies a subset of the set of multiple TTIs. The communications manager 1120 may be configured as or otherwise support a means for receiving, from the UE, an SRS in the subset of the set of multiple TTIs in accordance with the inter-TTI bitmap.

Additionally or alternatively, the communications manager 1120 may support wireless communications at a base station in accordance with examples as disclosed herein. For example, the communications manager 1120 may be configured as or otherwise support a means for transmitting, to a UE, control signaling indicating an SRS configuration identifying a set of multiple TTIs configured for SRS transmission. The communications manager 1120 may be configured as or otherwise support a means for transmitting, to the UE based on the SRS configuration, a control message indicating a starting location of an SRS transmission and a length of the SRS transmission within a first TTI of the set of multiple TTIs. The communications manager 1120 may be configured as or otherwise support a means for receiving, from the UE, an SRS in the first TTI in accordance with the control message.

Figure 12:
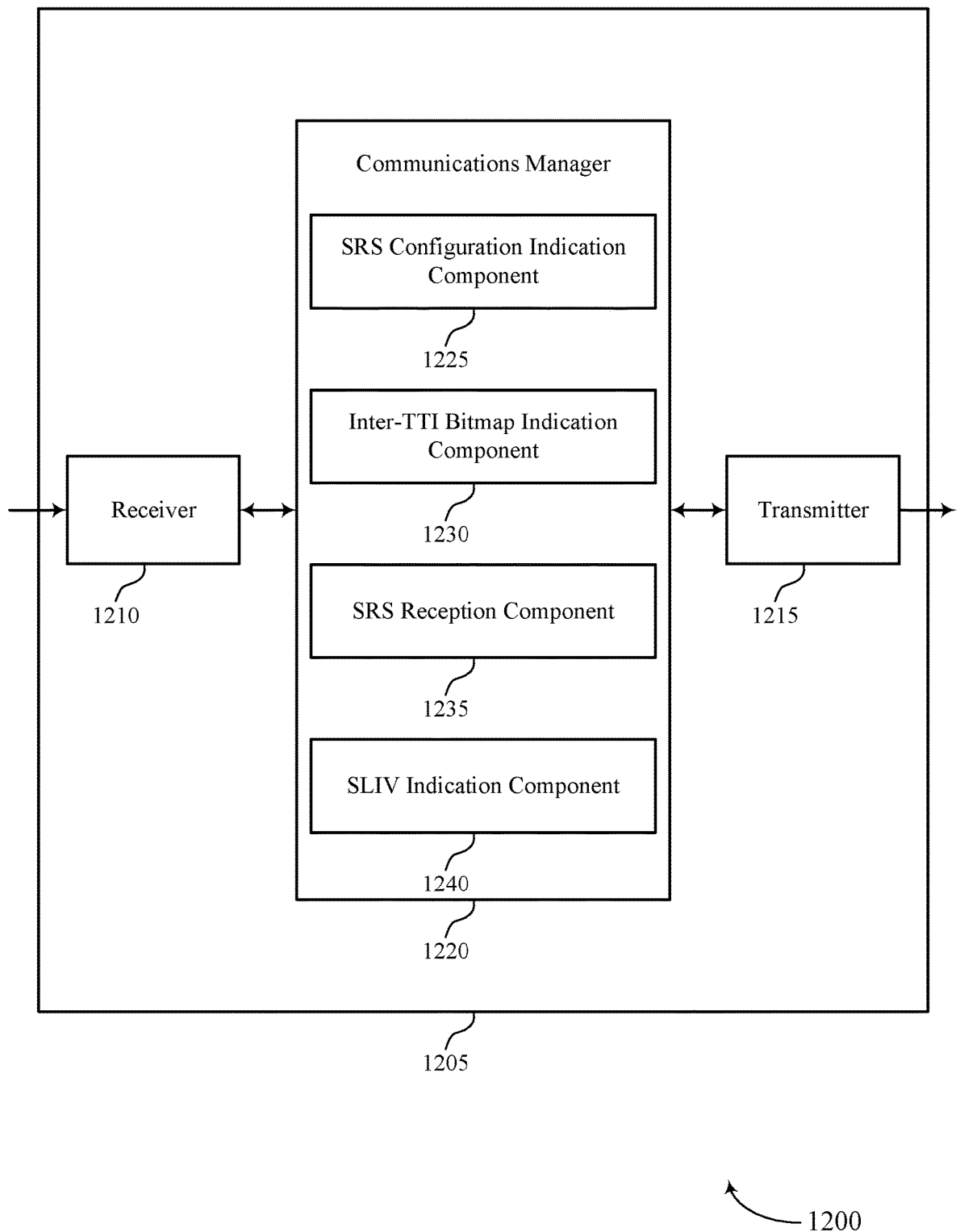

FIG. 12 shows a block diagram 1200 of a device 1205 that supports managing SRS repetitions through DCI in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to managing SRS repetitions through DCI). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to managing SRS repetitions through DCI). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of managing SRS repetitions through DCI as described herein. For example, the communications manager 1220 may include an SRS configuration indication component 1225, an inter-TTI bitmap indication component 1230, an SRS reception component 1235, an SLIV indication component 1240, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a base station in accordance with examples as disclosed herein. The SRS configuration indication component 1225 may be configured as or otherwise support a means for transmitting, to a UE, control signaling indicating an SRS configuration identifying a set of multiple TTIs configured for SRS transmission. The inter-TTI bitmap indication component 1230 may be configured as or otherwise support a means for transmitting, to the UE based on the SRS configuration, a control message indicating an inter-TTI bitmap that identifies a subset of the set of multiple TTIs. The SRS reception component 1235 may be configured as or otherwise support a means for receiving, from the UE, an SRS in the subset of the set of multiple TTIs in accordance with the inter-TTI bitmap.

Additionally or alternatively, the communications manager 1220 may support wireless communications at a base station in accordance with examples as disclosed herein. The SRS configuration indication component 1225 may be configured as or otherwise support a means for transmitting, to a UE, control signaling indicating an SRS configuration identifying a set of multiple TTIs configured for SRS transmission. The SLIV indication component 1240 may be configured as or otherwise support a means for transmitting, to the UE based on the SRS configuration, a control message indicating a starting location of an SRS transmission and a length of the SRS transmission within a first TTI of the set of multiple TTIs. The SRS reception component 1235 may be configured as or otherwise support a means for receiving, from the UE, an SRS in the first TTI in accordance with the control message.

Figure 13:
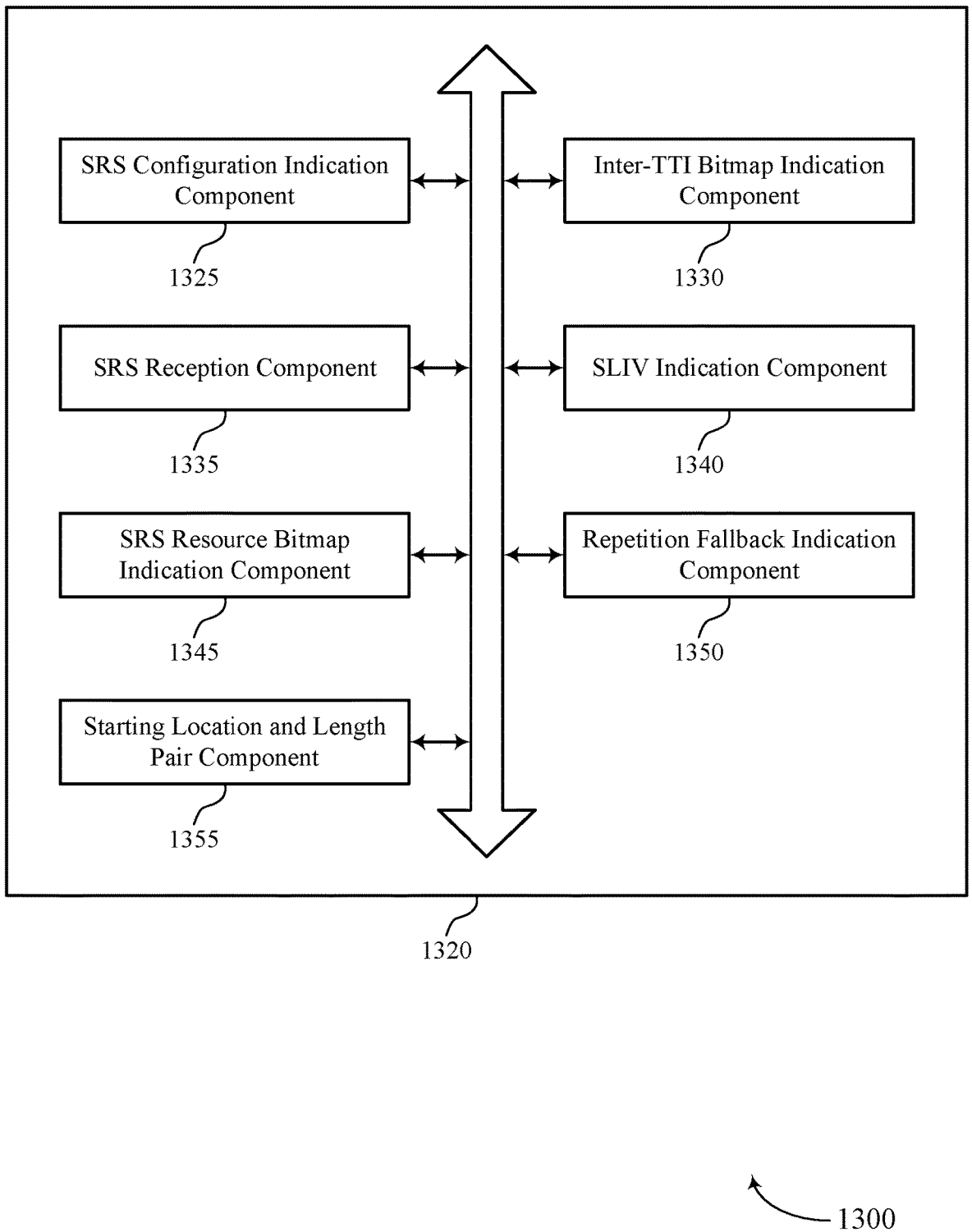
FIG. 13 shows a block diagram of a communications manager in accordance with aspects of the present disclosure.

FIG. 13 shows a block diagram 1300 of a communications manager 1320 that supports managing SRS repetitions through DCI in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of managing SRS repetitions through DCI as described herein. For example, the communications manager 1320 may include an SRS configuration indication component 1325, an inter-TTI bitmap indication component 1330, an SRS reception component 1335, an SLIV indication component 1340, an SRS resource bitmap indication component 1345, a repetition fallback indication component 1350, a starting location and length pair component 1355, or any combination thereof. Each of these components may communicate, directly or indirectly, with one another (e.g., via one or more buses).

The communications manager 1320 may support wireless communications at a base station in accordance with examples as disclosed herein. The SRS configuration indication component 1325 may be configured as or otherwise support a means for transmitting, to a UE, control signaling indicating an SRS configuration identifying a set of multiple TTIs configured for SRS transmission. The inter-TTI bitmap indication component 1330 may be configured as or otherwise support a means for transmitting, to the UE based on the SRS configuration, a control message indicating an inter-TTI bitmap that identifies a subset of the set of multiple TTIs. The SRS reception component 1335 may be configured as or otherwise support a means for receiving, from the UE, an SRS in the subset of the set of multiple TTIs in accordance with the inter-TTI bitmap.

In some examples, to support transmitting the control message indicating the inter-TTI bitmap, the inter-TTI bitmap indication component 1330 may be configured as or otherwise support a means for transmitting the inter-TTI bitmap including a set of multiple bits, each bit of the set of multiple bits representing a respective TTI of the set of multiple TTIs.

In some examples, to support transmitting the control message, the inter-TTI bitmap indication component 1330 may be configured as or otherwise support a means for transmitting the control message indicating for the UE to transmit the SRS via a specific SRS resource in each of the subset of the set of multiple TTIs, via each SRS of an SRS resource set in each of the subset of the set of multiple TTIs, via all SRS resources configured in each of the subset of the set of multiple TTIs, or a combination thereof.

In some examples, to support transmitting the control signaling indicating the SRS configuration, the SRS configuration indication component 1325 may be configured as or otherwise support a means for transmitting the control signaling including a parameter indicating a size of the inter-TTI bitmap.

In some examples, to support transmitting the control signaling indicating the SRS configuration, the SRS configuration indication component 1325 may be configured as or otherwise support a means for transmitting, to the UE, the control message indicating a set of multiple inter-TTI bitmaps for SRS transmission, where the control message indicates the inter-TTI bitmap from the set of multiple inter-TTI bitmaps.

In some examples, to support transmitting the control signaling indicating the SRS configuration, the SRS configuration indication component 1325 may be configured as or otherwise support a means for transmitting, to the UE, the control message including an activation message indicating for the UE to use the inter-TTI bitmap for SRS transmission.

In some examples, to support receiving the SRS, the SRS reception component 1335 may be configured as or otherwise support a means for receiving the SRS for one or more SRS occasions after the set of multiple TTIs ends, where a number for the one or more SRS occasions corresponds to a size of the inter-TTI bitmap.

In some examples, to support transmitting the control message indicating the inter-TTI bitmap, the inter-TTI bitmap indication component 1330 may be configured as or otherwise support a means for transmitting the control message indicating the inter-TTI bitmap that identifies the subset of the set of multiple TTIs for a frequency hop of a set of multiple frequency hops, where the SRS is received at the frequency hop in accordance with the inter-TTI bitmap.

In some examples, to support transmitting the control message, the SRS resource bitmap indication component 1345 may be configured as or otherwise support a means for transmitting, to the UE, the control message indicating one or more intra-TTI bitmaps identifying one or more subintervals in each of the subset of the set of multiple TTIs for SRS transmission, where the SRS is received in the one or more subintervals in the subset of the set of multiple TTIs based on the one or more intra-TTI bitmaps.

In some examples, to support transmitting the control message, the SRS resource bitmap indication component 1345 may be configured as or otherwise support a means for transmitting a single intra-TTI bitmap that is used for each of the set of multiple TTIs.

In some examples, the SRS resource bitmap indication component 1345 may be configured as or otherwise support a means for transmitting the control message or a second control message indicating a set of multiple intra-TTI bitmaps, each of the set of multiple intra-TTI bitmaps corresponding to a respective TTI of the set of multiple TTIs.

In some examples, the one or more intra-TTI bitmaps are configured per SRS resource.

In some examples, a size of the inter-TTI bitmap corresponds to a number of repetitions configured for SRS transmission across the set of multiple TTIs, to a window size configured for SRS transmission, or a combination thereof.

Additionally or alternatively, the communications manager 1320 may support wireless communications at a base station in accordance with examples as disclosed herein. In some examples, the SRS configuration indication component 1325 may be configured as or otherwise support a means for transmitting, to a UE, control signaling indicating an SRS configuration identifying a set of multiple TTIs configured for SRS transmission. The SLIV indication component 1340 may be configured as or otherwise support a means for transmitting, to the UE based on the SRS configuration, a control message indicating a starting location of an SRS transmission and a length of the SRS transmission within a first TTI of the set of multiple TTIs. In some examples, the SRS reception component 1335 may be configured as or otherwise support a means for receiving, from the UE, an SRS in the first TTI in accordance with the control message.

In some examples, to support transmitting the control message, the SLIV indication component 1340 may be configured as or otherwise support a means for transmitting the control message indicating the starting location as an offset value from a previously configured starting location.

In some examples, to support transmitting the control message, the SLIV indication component 1340 may be configured as or otherwise support a means for transmitting the control message indicating a set of multiple starting locations, each starting location of the set of multiple starting locations configured for a respective TTI of the set of multiple TTIs, where the set of multiple starting locations includes the starting location of the SRS transmission within the first TTI.

In some examples, to support transmitting the control message, the SLIV indication component 1340 may be configured as or otherwise support a means for transmitting the control message indicating the length of the SRS transmission within the first TTI that overrides a previously configured repetition factor for the SRS transmission.

In some examples, to support transmitting the control message, the SLIV indication component 1340 may be configured as or otherwise support a means for transmitting the control message indicating a set of multiple lengths, each length of the set of multiple lengths configured for a respective TTI of the set of multiple TTIs, where the set of multiple lengths includes the length of the SRS transmission within the first TTI.

In some examples, the repetition fallback indication component 1350 may be configured as or otherwise support a means for transmitting an additional control message indicating a different value for the length of the SRS transmission, where a previously configured repetition factor for the SRS transmission is used based on the additional control message indicating the different value for the length.

In some examples, the different value for the length includes an invalid value or a negative value.

In some examples, the starting location and length pair component 1355 may be configured as or otherwise support a means for transmitting a set of multiple starting location and length pairs configured for SRS transmission, where the control message indicates an individual starting location and length pair of the set of multiple starting location and length pairs.

In some examples, a same or different starting location and length pair is indicated for each of the set of multiple TTIs.

In some examples, to support transmitting the control message, the SLIV indication component 1340 may be configured as or otherwise support a means for transmitting the control message per SRS resource or per SRS resource set.

Figure 14:
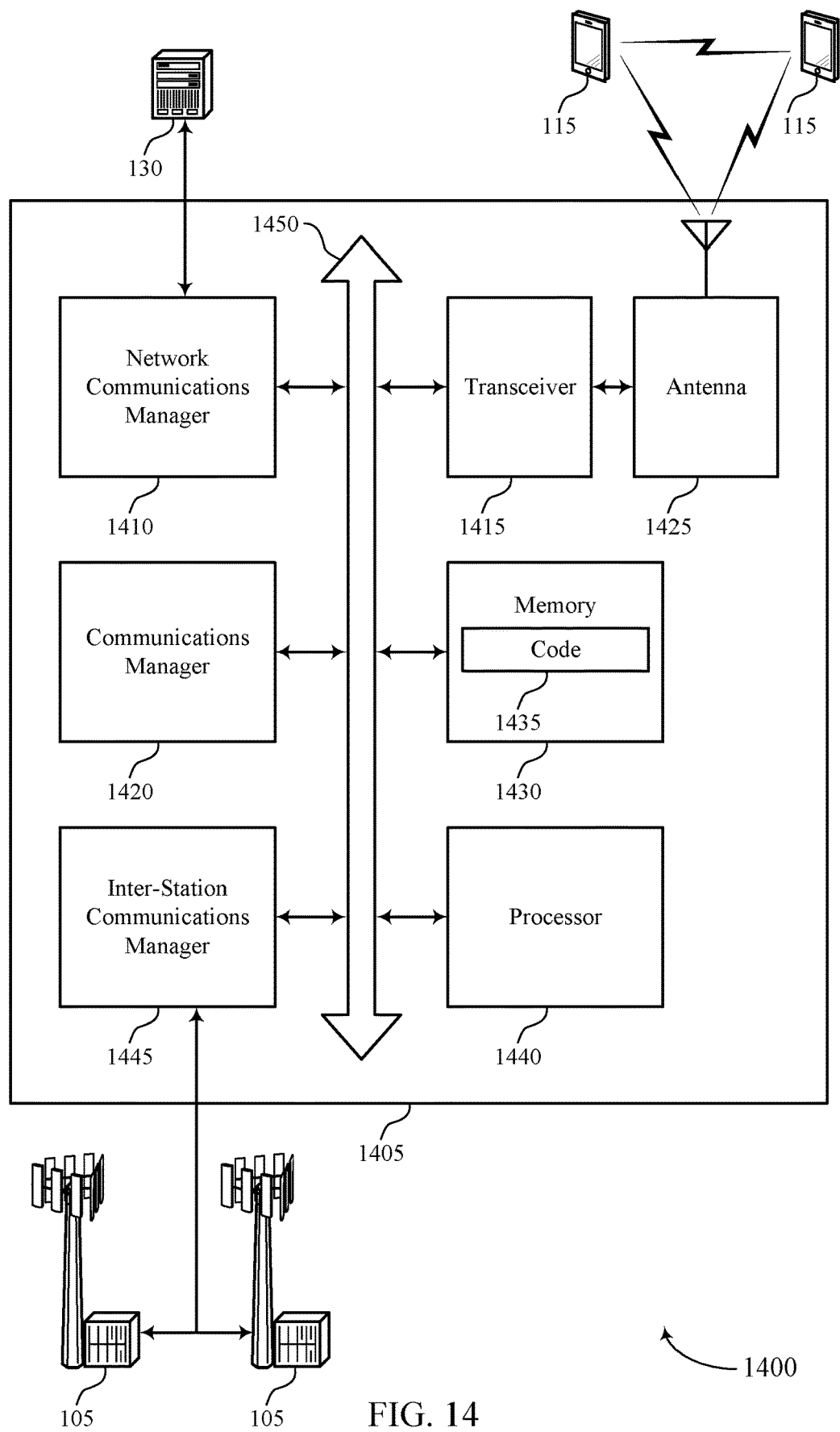
FIG. 14 shows a diagram of a system including a device in accordance with aspects of the present disclosure.

FIG. 14 shows a diagram of a system 1400 including a device 1405 that supports managing SRS repetitions through DCI in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting managing SRS repetitions through DCI). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communications at a base station in accordance with examples as disclosed herein. For example, the communications manager 1420 may be configured as or otherwise support a means for transmitting, to a UE, control signaling indicating an SRS configuration identifying a set of multiple TTIs configured for SRS transmission. The communications manager 1420 may be configured as or otherwise support a means for transmitting, to the UE based on the SRS configuration, a control message indicating an inter-TTI bitmap that identifies a subset of the set of multiple TTIs. The communications manager 1420 may be configured as or otherwise support a means for receiving, from the UE, an SRS in the subset of the set of multiple TTIs in accordance with the inter-TTI bitmap.

Additionally or alternatively, the communications manager 1420 may support wireless communications at a base station in accordance with examples as disclosed herein. For example, the communications manager 1420 may be configured as or otherwise support a means for transmitting, to a UE, control signaling indicating an SRS configuration identifying a set of multiple TTIs configured for SRS transmission. The communications manager 1420 may be configured as or otherwise support a means for transmitting, to the UE based on the SRS configuration, a control message indicating a starting location of an SRS transmission and a length of the SRS transmission within a first TTI of the set of multiple TTIs. The communications manager 1420 may be configured as or otherwise support a means for receiving, from the UE, an SRS in the first TTI in accordance with the control message.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of managing SRS repetitions through DCI as described herein, or the processor 1440 and the memory 1430 may be otherwise configured to perform or support such operations.

Figure 15:
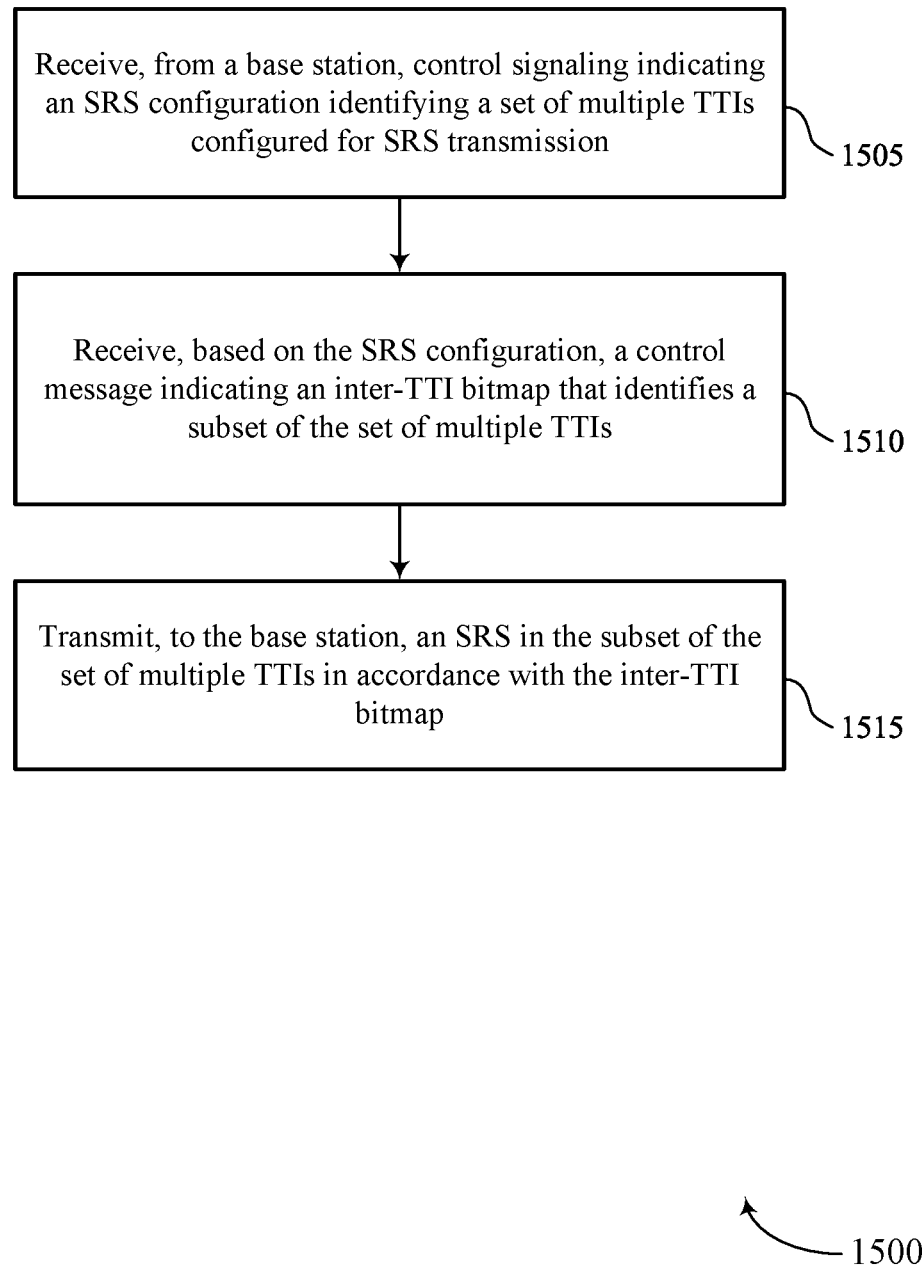
FIGS. 15 through 22 show flowcharts illustrating methods that support managing SRS repetitions through DCI in accordance with aspects of the present disclosure.

FIG. 15 shows a flowchart illustrating a method 1500 that supports managing SRS repetitions through DCI in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, control signaling indicating an SRS configuration identifying a set of multiple TTIs configured for SRS transmission. The operations of 1505 may be performed in accordance with examples as disclosed herein. In some examples, aspects of the operations of 1505 may be performed by an SRS configuration component 925 as described with reference to FIG. 9.

At 1510, the method may include receiving, based on the SRS configuration, a control message indicating an inter-TTI bitmap that identifies a subset of the set of multiple TTIs. The operations of 1510 may be performed in accordance with examples as disclosed herein. In some examples, aspects of the operations of 1510 may be performed by an inter-TTI bitmap component 930 as described with reference to FIG. 9.

At 1515, the method may include transmitting, to the base station, an SRS in the subset of the set of multiple TTIs in accordance with the inter-TTI bitmap. The operations of 1515 may be performed in accordance with examples as disclosed herein. In some examples, aspects of the operations of 1515 may be performed by an SRS transmission component 935 as described with reference to FIG. 9.

Figure 16:
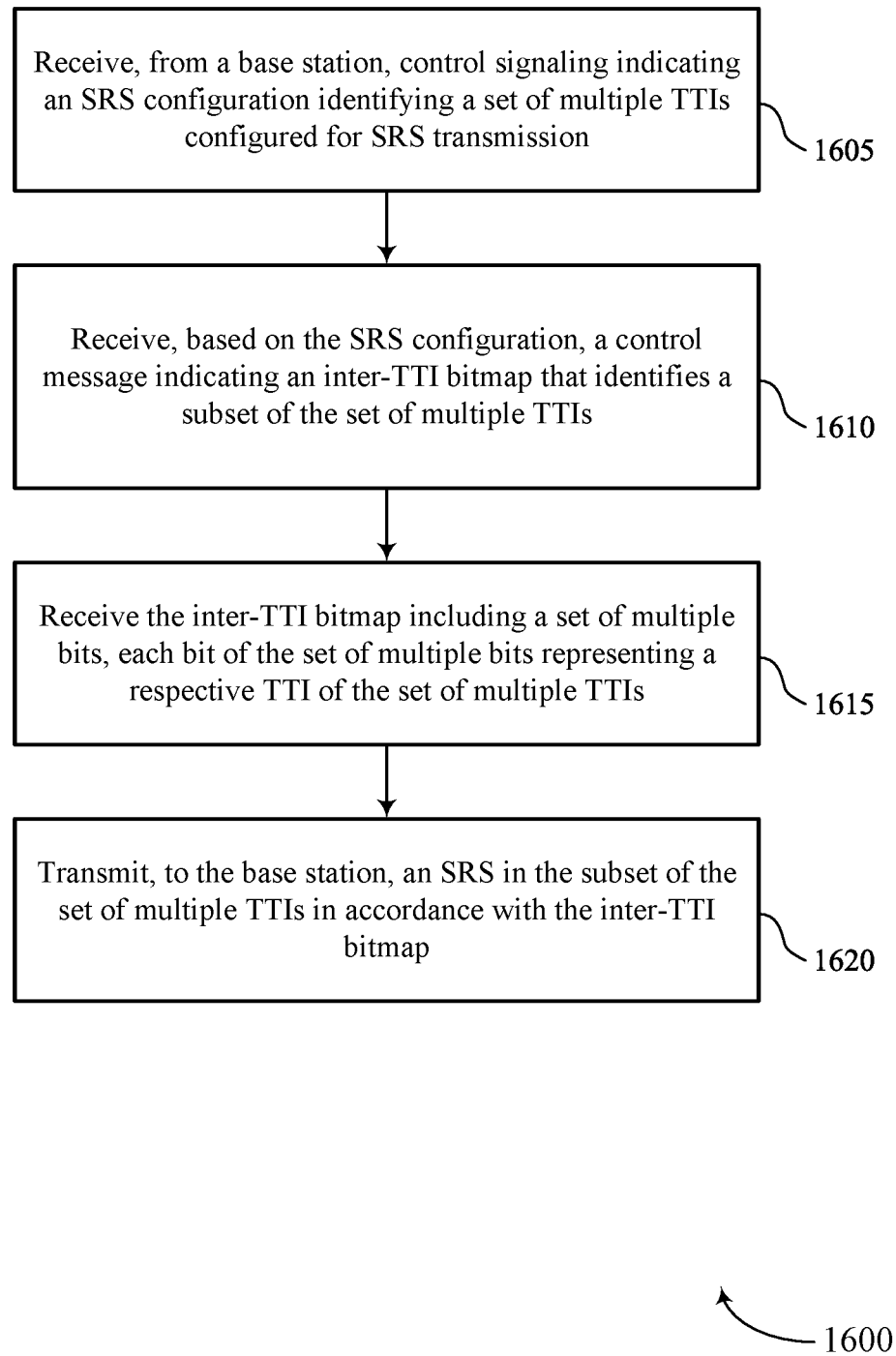

FIG. 16 shows a flowchart illustrating a method 1600 that supports managing SRS repetitions through DCI in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, control signaling indicating an SRS configuration identifying a set of multiple TTIs configured for SRS transmission. The operations of 1605 may be performed in accordance with examples as disclosed herein. In some examples, aspects of the operations of 1605 may be performed by an SRS configuration component 925 as described with reference to FIG. 9.

At 1610, the method may include receiving, based on the SRS configuration, a control message indicating an inter-TTI bitmap that identifies a subset of the set of multiple TTIs. The operations of 1610 may be performed in accordance with examples as disclosed herein. In some examples, aspects of the operations of 1610 may be performed by an inter-TTI bitmap component 930 as described with reference to FIG. 9.

At 1615, the method may include receiving the inter-TTI bitmap including a set of multiple bits, each bit of the set of multiple bits representing a respective TTI of the set of multiple TTIs. The operations of 1615 may be performed in accordance with examples as disclosed herein. In some examples, aspects of the operations of 1615 may be performed by an inter-TTI bitmap component 930 as described with reference to FIG. 9.

At 1620, the method may include transmitting, to the base station, an SRS in the subset of the set of multiple TTIs in accordance with the inter-TTI bitmap. The operations of 1620 may be performed in accordance with examples as disclosed herein. In some examples, aspects of the operations of 1620 may be performed by an SRS transmission component 935 as described with reference to FIG. 9.

Figure 17:
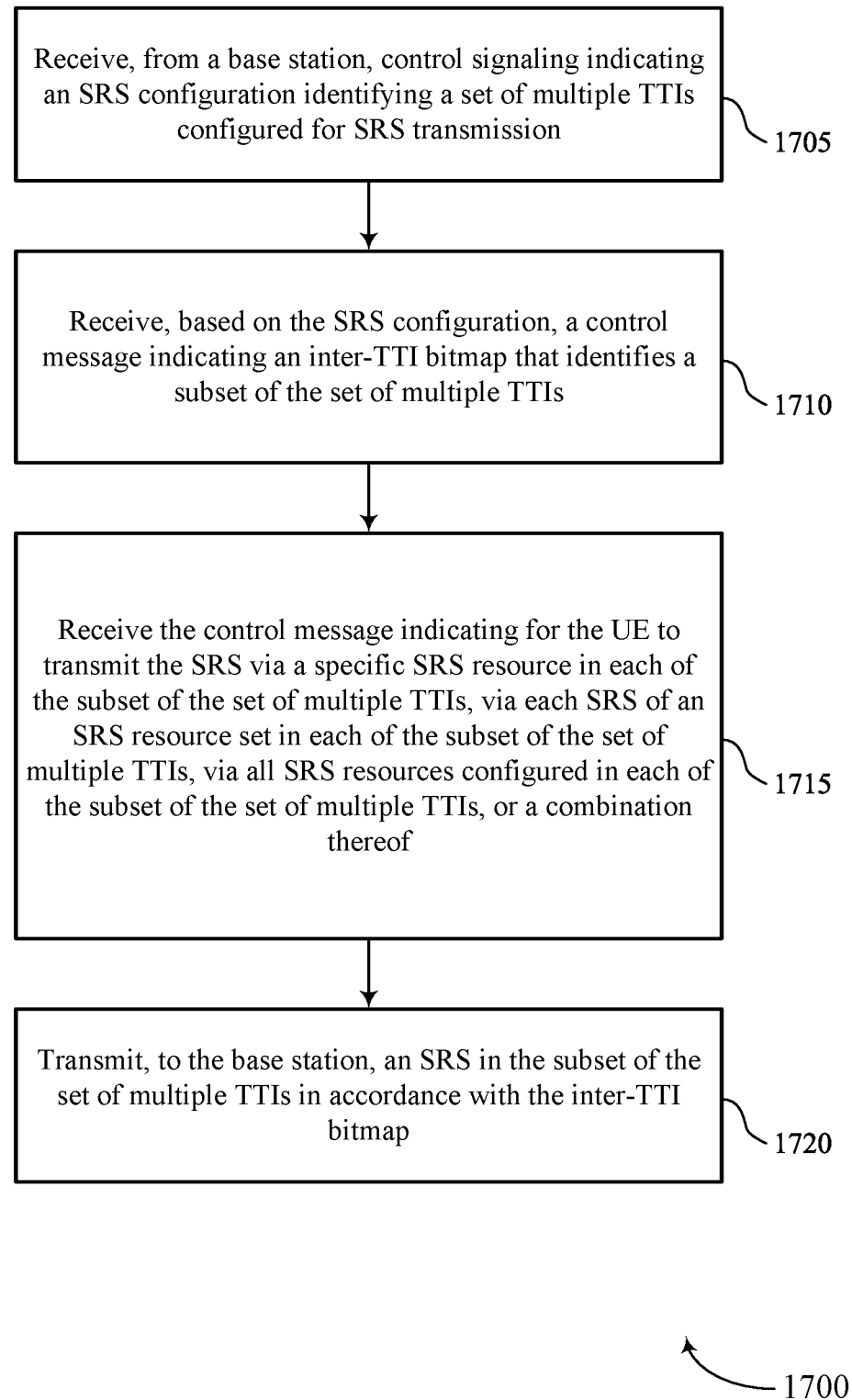

FIG. 17 shows a flowchart illustrating a method 1700 that supports managing SRS repetitions through DCI in accordance with aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1705, the method may include receiving, from a base station, control signaling indicating an SRS configuration identifying a set of multiple TTIs configured for SRS transmission. The operations of 1705 may be performed in accordance with examples as disclosed herein. In some examples, aspects of the operations of 1705 may be performed by an SRS configuration component 925 as described with reference to FIG. 9.

At 1710, the method may include receiving, based on the SRS configuration, a control message indicating an inter-TTI bitmap that identifies a subset of the set of multiple TTIs. The operations of 1710 may be performed in accordance with examples as disclosed herein. In some examples, aspects of the operations of 1710 may be performed by an inter-TTI bitmap component 930 as described with reference to FIG. 9.

At 1715, the method may include receiving the control message indicating for the UE to transmit the SRS via a specific SRS resource in each of the subset of the set of multiple TTIs, via each SRS of an SRS resource set in each of the subset of the set of multiple TTIs, via all SRS resources configured in each of the subset of the set of multiple TTIs, or a combination thereof. The operations of 1715 may be performed in accordance with examples as disclosed herein. In some examples, aspects of the operations of 1715 may be performed by an inter-TTI bitmap component 930 as described with reference to FIG. 9.

At 1720, the method may include transmitting, to the base station, an SRS in the subset of the set of multiple TTIs in accordance with the inter-TTI bitmap. The operations of 1720 may be performed in accordance with examples as disclosed herein. In some examples, aspects of the operations of 1720 may be performed by an SRS transmission component 935 as described with reference to FIG. 9.

Figure 18:
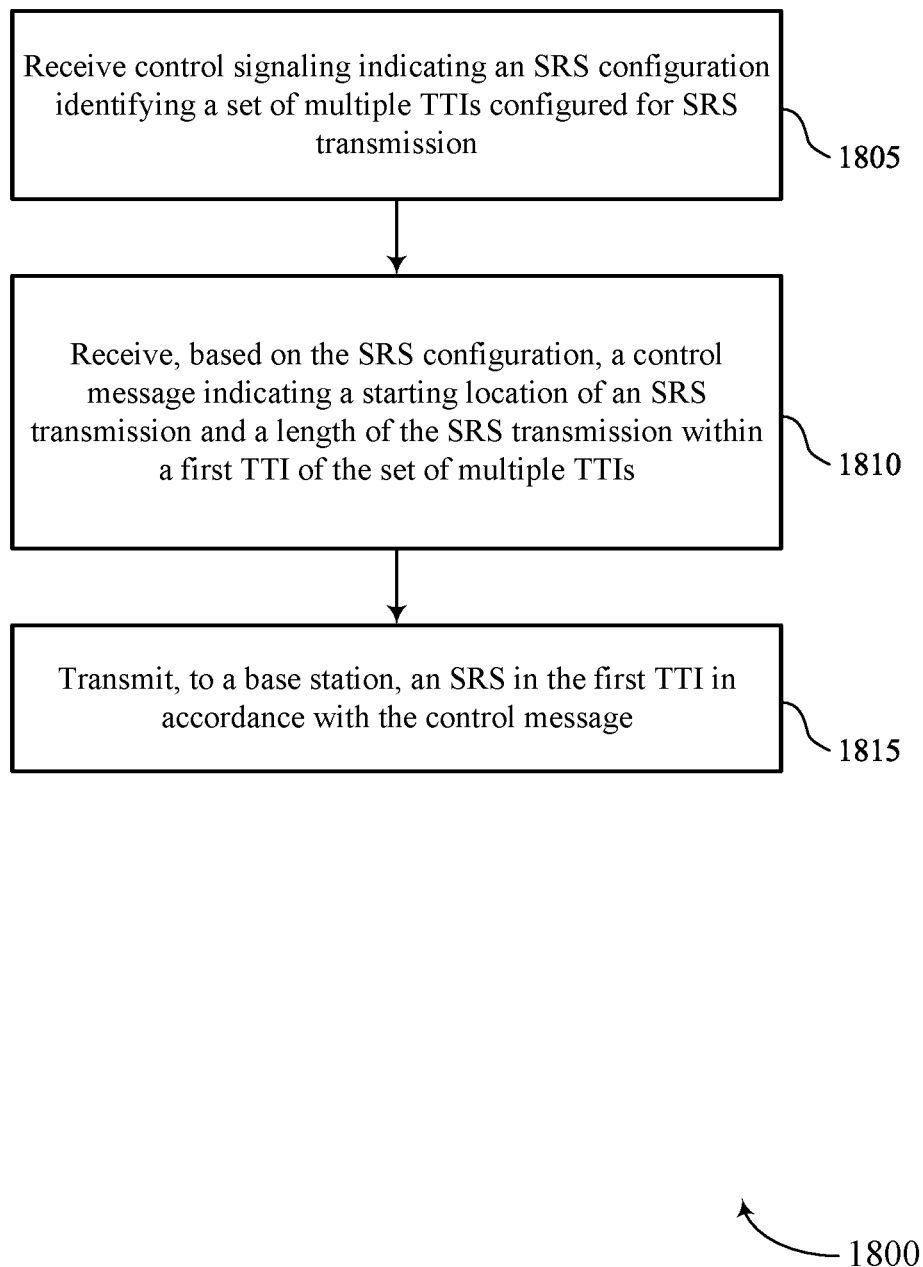

FIG. 18 shows a flowchart illustrating a method 1800 that supports managing SRS repetitions through DCI in accordance with aspects of the present disclosure. The operations of the method 1800 may be implemented by a UE or its components as described herein. For example, the operations of the method 1800 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1805, the method may include receiving control signaling indicating an SRS configuration identifying a set of multiple TTIs configured for SRS transmission. The operations of 1805 may be performed in accordance with examples as disclosed herein. In some examples, aspects of the operations of 1805 may be performed by an SRS configuration component 925 as described with reference to FIG. 9.

At 1810, the method may include receiving, based on the SRS configuration, a control message indicating a starting location of an SRS transmission and a length of the SRS transmission within a first TTI of the set of multiple TTIs. The operations of 1810 may be performed in accordance with examples as disclosed herein. In some examples, aspects of the operations of 1810 may be performed by an SLIV component 940 as described with reference to FIG. 9.

At 1815, the method may include transmitting, to a base station, an SRS in the first TTI in accordance with the control message. The operations of 1815 may be performed in accordance with examples as disclosed herein. In some examples, aspects of the operations of 1815 may be performed by an SRS transmission component 935 as described with reference to FIG. 9.

Figure 19:
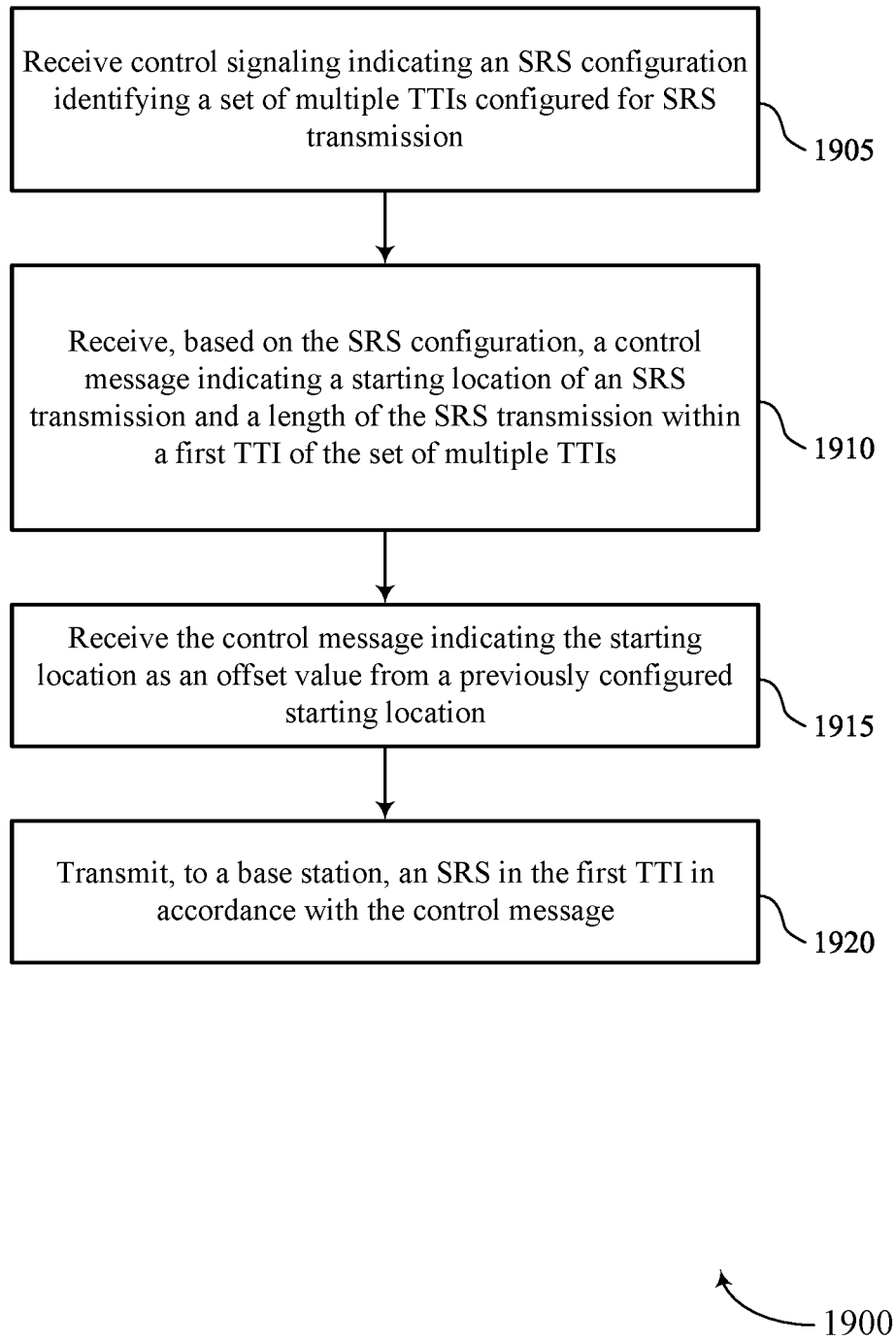

FIG. 19 shows a flowchart illustrating a method 1900 that supports managing SRS repetitions through DCI in accordance with aspects of the present disclosure. The operations of the method 1900 may be implemented by a UE or its components as described herein. For example, the operations of the method 1900 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1905, the method may include receiving control signaling indicating an SRS configuration identifying a set of multiple TTIs configured for SRS transmission. The operations of 1905 may be performed in accordance with examples as disclosed herein. In some examples, aspects of the operations of 1905 may be performed by an SRS configuration component 925 as described with reference to FIG. 9.

At 1910, the method may include receiving, based on the SRS configuration, a control message indicating a starting location of an SRS transmission and a length of the SRS transmission within a first TTI of the set of multiple TTIs. The operations of 1910 may be performed in accordance with examples as disclosed herein. In some examples, aspects of the operations of 1910 may be performed by an SLIV component 940 as described with reference to FIG. 9.

At 1915, the method may include receiving the control message indicating the starting location as an offset value from a previously configured starting location. The operations of 1915 may be performed in accordance with examples as disclosed herein. In some examples, aspects of the operations of 1915 may be performed by an SLIV component 940 as described with reference to FIG. 9.

At 1920, the method may include transmitting, to a base station, an SRS in the first TTI in accordance with the control message. The operations of 1920 may be performed in accordance with examples as disclosed herein. In some examples, aspects of the operations of 1920 may be performed by an SRS transmission component 935 as described with reference to FIG. 9.

Figure 20:
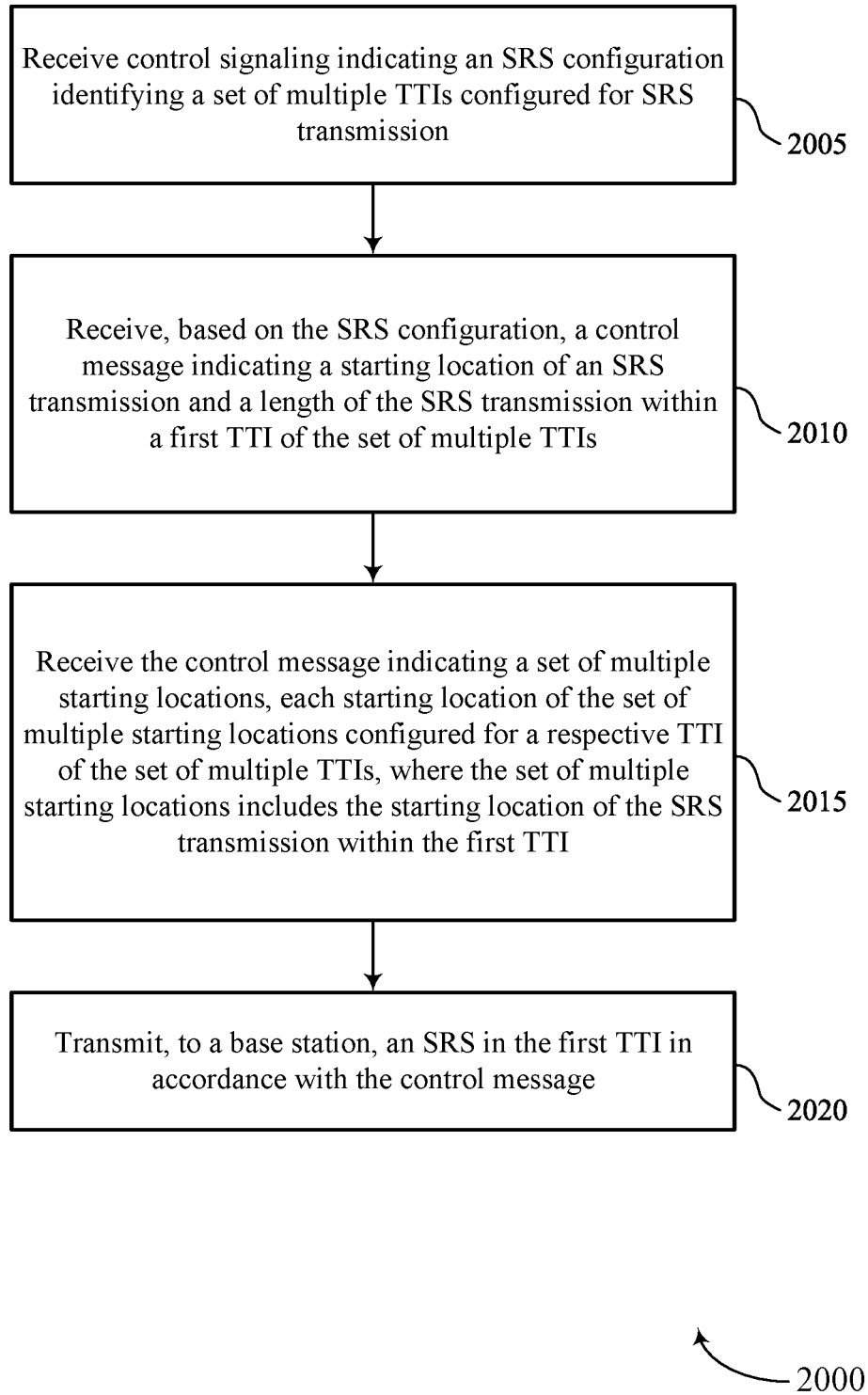

FIG. 20 shows a flowchart illustrating a method 2000 that supports managing SRS repetitions through DCI in accordance with aspects of the present disclosure. The operations of the method 2000 may be implemented by a UE or its components as described herein. For example, the operations of the method 2000 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 2005, the method may include receiving control signaling indicating an SRS configuration identifying a set of multiple TTIs configured for SRS transmission. The operations of 2005 may be performed in accordance with examples as disclosed herein. In some examples, aspects of the operations of 2005 may be performed by an SRS configuration component 925 as described with reference to FIG. 9.

At 2010, the method may include receiving, based on the SRS configuration, a control message indicating a starting location of an SRS transmission and a length of the SRS transmission within a first TTI of the set of multiple TTIs. The operations of 2010 may be performed in accordance with examples as disclosed herein. In some examples, aspects of the operations of 2010 may be performed by an SLIV component 940 as described with reference to FIG. 9.

At 2015, the method may include receiving the control message indicating a set of multiple starting locations, each starting location of the set of multiple starting locations configured for a respective TTI of the set of multiple TTIs, where the set of multiple starting locations includes the starting location of the SRS transmission within the first TTI. The operations of 2015 may be performed in accordance with examples as disclosed herein. In some examples, aspects of the operations of 2015 may be performed by an SLIV component 940 as described with reference to FIG. 9.

At 2020, the method may include transmitting, to a base station, an SRS in the first TTI in accordance with the control message. The operations of 2020 may be performed in accordance with examples as disclosed herein. In some examples, aspects of the operations of 2020 may be performed by an SRS transmission component 935 as described with reference to FIG. 9.

Figure 21:
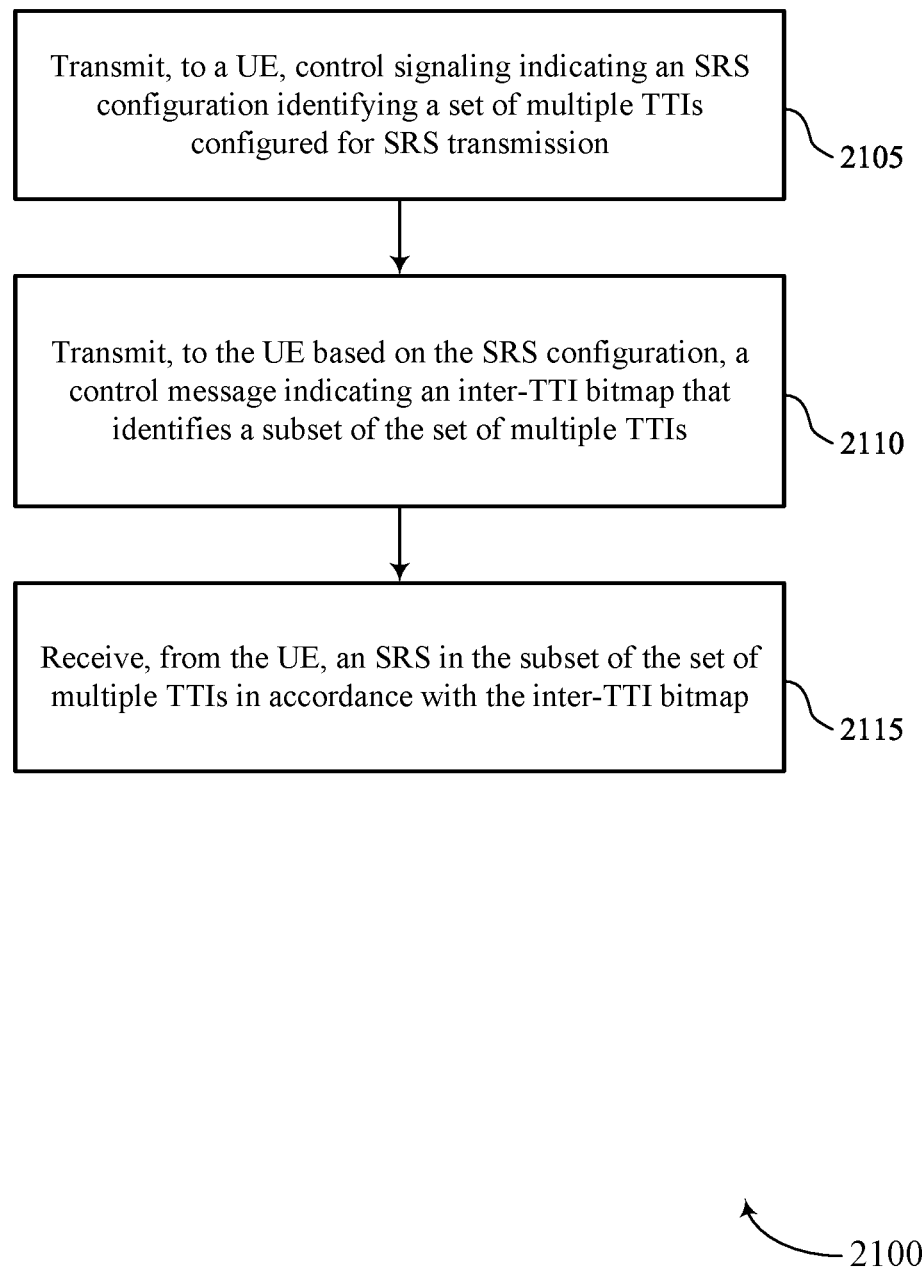

FIG. 21 shows a flowchart illustrating a method 2100 that supports managing SRS repetitions through DCI in accordance with aspects of the present disclosure. The operations of the method 2100 may be implemented by a base station or its components as described herein. For example, the operations of the method 2100 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 2105, the method may include transmitting, to a UE, control signaling indicating an SRS configuration identifying a set of multiple TTIs configured for SRS transmission. The operations of 2105 may be performed in accordance with examples as disclosed herein. In some examples, aspects of the operations of 2105 may be performed by an SRS configuration indication component 1325 as described with reference to FIG. 13.

At 2110, the method may include transmitting, to the UE based on the SRS configuration, a control message indicating an inter-TTI bitmap that identifies a subset of the set of multiple TTIs. The operations of 2110 may be performed in accordance with examples as disclosed herein. In some examples, aspects of the operations of 2110 may be performed by an inter-TTI bitmap indication component 1330 as described with reference to FIG. 13.

At 2115, the method may include receiving, from the UE, an SRS in the subset of the set of multiple TTIs in accordance with the inter-TTI bitmap. The operations of 2115 may be performed in accordance with examples as disclosed herein. In some examples, aspects of the operations of 2115 may be performed by an SRS reception component 1335 as described with reference to FIG. 13.

Figure 22:
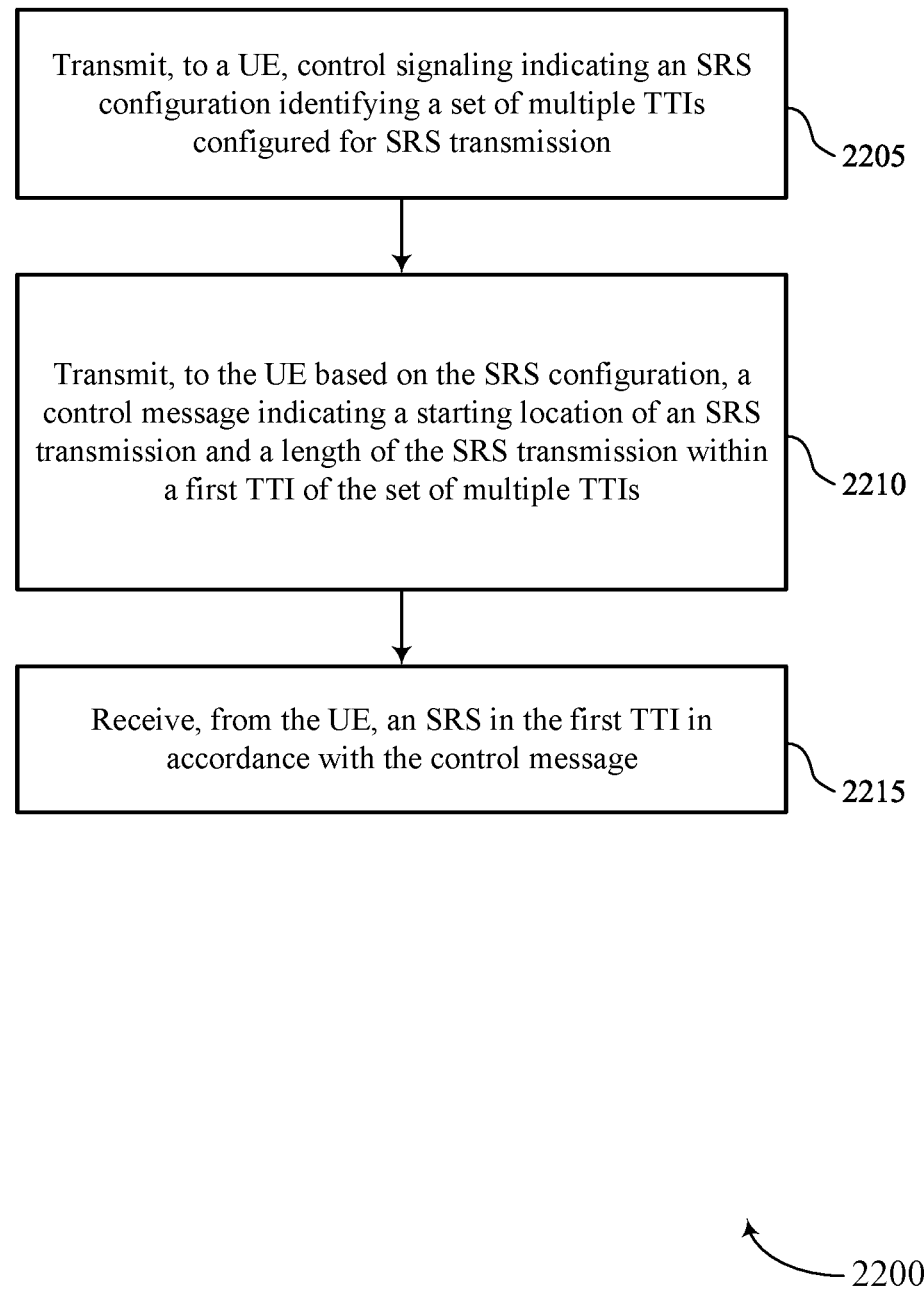

FIG. 22 shows a flowchart illustrating a method 2200 that supports managing SRS repetitions through DCI in accordance with aspects of the present disclosure. The operations of the method 2200 may be implemented by a base station or its components as described herein. For example, the operations of the method 2200 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 2205, the method may include transmitting, to a UE, control signaling indicating an SRS configuration identifying a set of multiple TTIs configured for SRS transmission. The operations of 2205 may be performed in accordance with examples as disclosed herein. In some examples, aspects of the operations of 2205 may be performed by an SRS configuration indication component 1325 as described with reference to FIG. 13.

At 2210, the method may include transmitting, to the UE based on the SRS configuration, a control message indicating a starting location of an SRS transmission and a length of the SRS transmission within a first TTI of the set of multiple TTIs. The operations of 2210 may be performed in accordance with examples as disclosed herein. In some examples, aspects of the operations of 2210 may be performed by an SLIV indication component 1340 as described with reference to FIG. 13.

At 2215, the method may include receiving, from the UE, an SRS in the first TTI in accordance with the control message. The operations of 2215 may be performed in accordance with examples as disclosed herein. In some examples, aspects of the operations of 2215 may be performed by an SRS reception component 1335 as described with reference to FIG. 13.

The following provides an overview of aspects of the present disclosure:

Aspect 1: A method for wireless communications at a UE, comprising: receiving, from a base station, control signaling indicating a sounding reference signal configuration identifying a plurality of transmission time intervals configured for sounding reference signal transmission; receiving, based at least in part on the sounding reference signal configuration, a control message indicating an inter-transmission time interval bitmap that identifies a subset of the plurality of transmission time intervals; and transmitting, to the base station, a sounding reference signal in the subset of the plurality of transmission time intervals in accordance with the inter-transmission time interval bitmap.

Aspect 2: The method of aspect 1, wherein receiving the control message indicating the inter-transmission time interval bitmap comprises: receiving the inter-transmission time interval bitmap comprising a plurality of bits, each bit of the plurality of bits representing a respective transmission time interval of the plurality of transmission time intervals.

Aspect 3: The method of any of aspects 1 through 2, wherein receiving the control message comprises: receiving the control message indicating for the UE to transmit the sounding reference signal via a specific sounding reference signal resource in each of the subset of the plurality of transmission time intervals, via each sounding reference signal of a sounding reference signal resource set in each of the subset of the plurality of transmission time intervals, via all sounding reference signal resources configured in each of the subset of the plurality of transmission time intervals, or a combination thereof.

Aspect 4: The method of any of aspects 1 through 3, wherein receiving the control signaling indicating the sounding reference signal configuration comprises: receiving the control signaling comprising a parameter indicating a size of the inter-transmission time interval bitmap.

Aspect 5: The method of any of aspects 1 through 4, wherein receiving the control signaling indicating the sounding reference signal configuration comprises: receiving the control signaling indicating a plurality of inter-transmission time interval bitmaps, wherein the control message indicates the inter-transmission time interval bitmap from the plurality of inter-transmission time interval bitmaps.

Aspect 6: The method of any of aspects 1 through 5, wherein receiving the control message comprises: receiving the control message comprising an activation message indicating for the UE to use the inter-transmission time interval bitmap.

Aspect 7: The method of any of aspects 1 through 6, wherein transmitting the sounding reference signal comprises: transmitting the sounding reference signal for one or more sounding reference signal occasions after the plurality of transmission time intervals ends, wherein a number of the one or more sounding reference signal occasions corresponds to a size of the inter-transmission time interval bitmap.

Aspect 8: The method of any of aspects 1 through 7, wherein receiving the control message indicating the inter-transmission time interval bitmap further comprises: receiving the control message indicating the inter-transmission time interval bitmap that identifies the subset of the plurality of transmission time intervals corresponds to a frequency hop of a plurality of frequency hops, wherein the sounding reference signal is transmitted at the frequency hop in accordance with the inter-transmission time interval bitmap.

Aspect 9: The method of any of aspects 1 through 8, wherein receiving the control message comprises: receiving the control message indicating one or more intra-transmission time interval bitmaps identifying one or more subintervals in each of the subset of the plurality of transmission time intervals, wherein the sounding reference signal is transmitted in the one or more subintervals in the subset of the plurality of transmission time intervals based at least in part on the one or more intra-transmission time interval bitmaps.

Aspect 10: The method of aspect 9, wherein receiving the control message comprises: receiving a single intra-transmission time interval bitmap that is used for each of the plurality of transmission time intervals.

Aspect 11: The method of any of aspects 9 through 10, further comprising: receiving the control message or a second control message indicating a plurality of intra-transmission time interval bitmaps, each of the plurality of intra-transmission time interval bitmaps corresponding to a respective transmission time interval of the plurality of transmission time intervals.

Aspect 12: The method of any of aspects 9 through 11, wherein the one or more intra-transmission time interval bitmaps are configured per sounding reference signal resource.

Aspect 13: The method of any of aspects 1 through 12, further comprising: disabling the inter-transmission time interval bitmap after the plurality of transmission time intervals ends.

Aspect 14: The method of any of aspects 1 through 13, wherein a size of the inter-transmission time interval bitmap corresponds to a number of repetitions configured for sounding reference signal transmission across the plurality of transmission time intervals, to a window size configured for sounding reference signal transmission, or a combination thereof.

Aspect 15: A method for wireless communications at a UE, comprising: receiving control signaling indicating a sounding reference signal configuration identifying a plurality of transmission time intervals configured for sounding reference signal transmission; receiving, based at least in part on the sounding reference signal configuration, a control message indicating a starting location of a sounding reference signal transmission and a length of the sounding reference signal transmission within a first transmission time interval of the plurality of transmission time intervals; and transmitting, to a base station, a sounding reference signal in the first transmission time interval in accordance with the control message.

Aspect 16: The method of aspect 15, wherein receiving the control message comprises: receiving the control message indicating the starting location as an offset value from a previously configured starting location.

Aspect 17: The method of any of aspects 15 through 16, wherein receiving the control message comprises: receiving the control message indicating a plurality of starting locations, each starting location of the plurality of starting locations configured for a respective transmission time interval of the plurality of transmission time intervals, wherein the plurality of starting locations comprises the starting location of the sounding reference signal transmission within the first transmission time interval.

Aspect 18: The method of any of aspects 15 through 17, wherein receiving the control message comprises: receiving the control message indicating the length of the sounding reference signal transmission within the first transmission time interval that overrides a previously configured repetition factor for the sounding reference signal transmission.

Aspect 19: The method of any of aspects 15 through 18, wherein receiving the control message comprises: receiving the control message indicating a plurality of lengths, each length of the plurality of lengths configured for a respective transmission time interval of the plurality of transmission time intervals, wherein the plurality of lengths comprises the length of the sounding reference signal transmission within the first transmission time interval.

Aspect 20: The method of any of aspects 15 through 19, further comprising: receiving an additional control message indicating a different value for the length of the sounding reference signal transmission, wherein a previously configured repetition factor for the sounding reference signal transmission is used based at least in part on the additional control message indicating the different value for the length.

Aspect 21: The method of aspect 20, wherein the different value for the length comprises an invalid value or a negative value.

Aspect 22: The method of any of aspects 15 through 21, further comprising: receiving a plurality of starting location and length pairs configured for sounding reference signal transmission, wherein the control message indicates an individual starting location and length pair of the plurality of starting location and length pairs.

Aspect 23: The method of aspect 22, wherein a same or different starting location and length pair is indicated for each of the plurality of transmission time intervals.

Aspect 24: The method of any of aspects 15 through 23, wherein receiving the control message comprises: receiving the control message per sounding reference signal resource or per sounding reference signal resource set.

Aspect 25: A method for wireless communications at a base station, comprising: transmitting, to a UE, control signaling indicating a sounding reference signal configuration identifying a plurality of transmission time intervals configured for sounding reference signal transmission; transmitting, to the UE based at least in part on the sounding reference signal configuration, a control message indicating an inter-transmission time interval bitmap that identifies a subset of the plurality of transmission time intervals; and receiving, from the UE, a sounding reference signal in the subset of the plurality of transmission time intervals in accordance with the inter-transmission time interval bitmap.

Aspect 26: The method of aspect 25, wherein transmitting the control message indicating the inter-transmission time interval bitmap comprises: transmitting the inter-transmission time interval bitmap comprising a plurality of bits, each bit of the plurality of bits representing a respective transmission time interval of the plurality of transmission time intervals.

Aspect 27: The method of any of aspects 25 through 26, wherein transmitting the control message comprises: transmitting the control message indicating for the UE to transmit the sounding reference signal via a specific sounding reference signal resource in each of the subset of the plurality of transmission time intervals, via each sounding reference signal of a sounding reference signal resource set in each of the subset of the plurality of transmission time intervals, via all sounding reference signal resources configured in each of the subset of the plurality of transmission time intervals, or a combination thereof.

Aspect 28: The method of any of aspects 25 through 27, wherein transmitting the control signaling indicating the sounding reference signal configuration comprises: transmitting the control signaling comprising a parameter indicating a size of the inter-transmission time interval bitmap.

Aspect 29: The method of any of aspects 25 through 28, wherein transmitting the control signaling indicating the sounding reference signal configuration comprises: transmitting, to the UE, the control message indicating a plurality of inter-transmission time interval bitmaps for sounding reference signal transmission, wherein the control message indicates the inter-transmission time interval bitmap from the plurality of inter-transmission time interval bitmaps.

Aspect 30: The method of any of aspects 25 through 29, wherein transmitting the control signaling indicating the sounding reference signal configuration comprises: transmitting, to the UE, the control message comprising an activation message indicating for the UE to use the inter-transmission time interval bitmap for sounding reference signal transmission.

Aspect 31: The method of any of aspects 25 through 30, wherein receiving the sounding reference signal comprises: receiving the sounding reference signal for one or more sounding reference signal occasions after the plurality of transmission time intervals ends, wherein a number for the one or more sounding reference signal occasions corresponds to a size of the inter-transmission time interval bitmap.

Aspect 32: The method of any of aspects 25 through 31, wherein transmitting the control message indicating the inter-transmission time interval bitmap further comprises: transmitting the control message indicating the inter-transmission time interval bitmap that identifies the subset of the plurality of transmission time intervals for a frequency hop of a plurality of frequency hops, wherein the sounding reference signal is received at the frequency hop in accordance with the inter-transmission time interval bitmap.

Aspect 33: The method of any of aspects 25 through 32, wherein transmitting the control message comprises: transmitting, to the UE, the control message indicating one or more intra-transmission time interval bitmaps identifying one or more subintervals in each of the subset of the plurality of transmission time intervals for sounding reference signal transmission, wherein the sounding reference signal is received in the one or more subintervals in the subset of the plurality of transmission time intervals based at least in part on the one or more intra-transmission time interval bitmaps.

Aspect 34: The method of aspect 33, wherein transmitting the control message comprises: transmitting a single intra-transmission time interval bitmap that is used for each of the plurality of transmission time intervals.

Aspect 35: The method of any of aspects 33 through 34, further comprising: transmitting the control message or a second control message indicating a plurality of intra-transmission time interval bitmaps, each of the plurality of intra-transmission time interval bitmaps corresponding to a respective transmission time interval of the plurality of transmission time intervals.

Aspect 36: The method of any of aspects 33 through 35, wherein the one or more intra-transmission time interval bitmaps are configured per sounding reference signal resource.

Aspect 37: The method of any of aspects 25 through 36, wherein a size of the inter-transmission time interval bitmap corresponds to a number of repetitions configured for sounding reference signal transmission across the plurality of transmission time intervals, to a window size configured for sounding reference signal transmission, or a combination thereof.

Aspect 38: A method for wireless communications at a base station, comprising: transmitting, to a UE, control signaling indicating a sounding reference signal configuration identifying a plurality of transmission time intervals configured for sounding reference signal transmission; transmitting, to the UE based at least in part on the sounding reference signal configuration, a control message indicating a starting location of a sounding reference signal transmission and a length of the sounding reference signal transmission within a first transmission time interval of the plurality of transmission time intervals; and receiving, from the UE, a sounding reference signal in the first transmission time interval in accordance with the control message.

Aspect 39: The method of aspect 38, wherein transmitting the control message comprises: transmitting the control message indicating the starting location as an offset value from a previously configured starting location.

Aspect 40: The method of any of aspects 38 through 39, wherein transmitting the control message comprises: transmitting the control message indicating a plurality of starting locations, each starting location of the plurality of starting locations configured for a respective transmission time interval of the plurality of transmission time intervals, wherein the plurality of starting locations comprises the starting location of the sounding reference signal transmission within the first transmission time interval.

Aspect 41: The method of any of aspects 38 through 40, wherein transmitting the control message comprises: transmitting the control message indicating the length of the sounding reference signal transmission within the first transmission time interval that overrides a previously configured repetition factor for the sounding reference signal transmission.

Aspect 42: The method of any of aspects 38 through 41, wherein transmitting the control message comprises: transmitting the control message indicating a plurality of lengths, each length of the plurality of lengths configured for a respective transmission time interval of the plurality of transmission time intervals, wherein the plurality of lengths comprises the length of the sounding reference signal transmission within the first transmission time interval.

Aspect 43: The method of any of aspects 38 through 42, further comprising: transmitting an additional control message indicating a different value for the length of the sounding reference signal transmission, wherein a previously configured repetition factor for the sounding reference signal transmission is used based at least in part on the additional control message indicating the different value for the length.

Aspect 44: The method of aspect 43, wherein the different value for the length comprises an invalid value or a negative value.

Aspect 45: The method of any of aspects 38 through 44, further comprising: transmitting a plurality of starting location and length pairs configured for sounding reference signal transmission, wherein the control message indicates an individual starting location and length pair of the plurality of starting location and length pairs.

Aspect 46: The method of aspect 45, wherein a same or different starting location and length pair is indicated for each of the plurality of transmission time intervals.

Aspect 47: The method of any of aspects 38 through 46, wherein transmitting the control message comprises: transmitting the control message per sounding reference signal resource or per sounding reference signal resource set.

Aspect 48: An apparatus for wireless communications at a UE, comprising a processor; memory coupled with the processor; and instructions stored in the memory and executable by the processor to cause the apparatus to perform a method of any of aspects 1 through 14.

Aspect 49: An apparatus for wireless communications at a UE, comprising at least one means for performing a method of any of aspects 1 through 14.

Aspect 50: A non-transitory computer-readable medium storing code for wireless communications at a UE, the code comprising instructions executable by a processor to perform a method of any of aspects 1 through 14.

Aspect 51: An apparatus for wireless communications at a UE, comprising a processor; memory coupled with the processor; and instructions stored in the memory and executable by the processor to cause the apparatus to perform a method of any of aspects 15 through 24.

Aspect 52: An apparatus for wireless communications at a UE, comprising at least one means for performing a method of any of aspects 15 through 24.

Aspect 53: A non-transitory computer-readable medium storing code for wireless communications at a UE, the code comprising instructions executable by a processor to perform a method of any of aspects 15 through 24.

Aspect 54: An apparatus for wireless communications at a base station, comprising a processor; memory coupled with the processor; and instructions stored in the memory and executable by the processor to cause the apparatus to perform a method of any of aspects 25 through 37.

Aspect 55: An apparatus for wireless communications at a base station, comprising at least one means for performing a method of any of aspects 25 through 37.

Aspect 56: A non-transitory computer-readable medium storing code for wireless communications at a base station, the code comprising instructions executable by a processor to perform a method of any of aspects 25 through 37.

Aspect 57: An apparatus for wireless communications at a base station, comprising a processor; memory coupled with the processor; and instructions stored in the memory and executable by the processor to cause the apparatus to perform a method of any of aspects 38 through 47.

Aspect 58: An apparatus for wireless communications at a base station, comprising at least one means for performing a method of any of aspects 38 through 47.

Aspect 59: A non-transitory computer-readable medium storing code for wireless communications at a base station, the code comprising instructions executable by a processor to perform a method of any of aspects 38 through 47.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:

receiving, from a network device, control signaling indicating a sounding reference signal configuration identifying a plurality of transmission time intervals configured for sounding reference signal transmission;

receiving, from the network device and based at least in part on the sounding reference signal configuration, a control message indicating an inter-transmission time interval bitmap that identifies a subset of the plurality of transmission time intervals; and transmitting, to the network device, a sounding reference signal in the subset of the plurality of transmission time intervals in accordance with the inter-transmission time interval bitmap.

2. The method of claim 1, wherein receiving the control message indicating the inter-transmission time interval bitmap comprises:
receiving the inter-transmission time interval bitmap comprising a plurality of bits, each bit of the plurality of bits representing a respective transmission time interval of the plurality of transmission time intervals.

3. The method of claim 1, wherein receiving the control message comprises:
receiving the control message indicating for the UE to transmit the sounding reference signal via a specific sounding reference signal resource in each of the subset of the plurality of transmission time intervals, via each sounding reference signal of a sounding reference signal resource set in each of the subset of the plurality of transmission time intervals, via all sounding reference signal resources configured in each of the subset of the plurality of transmission time intervals, or a combination thereof.

4. The method of claim 1, wherein receiving the control signaling indicating the sounding reference signal configuration comprises:
receiving the control signaling comprising a parameter indicating a size of the inter-transmission time interval bitmap.

5. The method of claim 1, wherein receiving the control signaling indicating the sounding reference signal configuration comprises:
receiving the control signaling indicating a plurality of inter-transmission time interval bitmaps, wherein the control message indicates the inter-transmission time interval bitmap from the plurality of inter-transmission time interval bitmaps.

6. The method of claim 1, wherein receiving the control message comprises:
receiving the control message comprising an activation message indicating for the UE to use the inter-transmission time interval bitmap.

7. The method of claim 1, wherein transmitting the sounding reference signal comprises:
transmitting the sounding reference signal for one or more sounding reference signal occasions after the plurality of transmission time intervals ends, wherein a number of the one or more sounding reference signal occasions corresponds to a size of the inter-transmission time interval bitmap.

8. The method of claim 1, wherein receiving the control message indicating the inter-transmission time interval bitmap further comprises:
receiving the control message indicating the inter-transmission time interval bitmap that identifies the subset of the plurality of transmission time intervals corresponds to a frequency hop of a plurality of frequency hops, wherein the sounding reference signal is transmitted at the frequency hop in accordance with the inter-transmission time interval bitmap.

9. The method of claim 1, wherein receiving the control message comprises:
receiving the control message indicating one or more intra-transmission time interval bitmaps identifying one or more subintervals in each of the subset of the plurality of transmission time intervals, wherein the sounding reference signal is transmitted in the one or more subintervals in the subset of the plurality of transmission time intervals based at least in part on the one or more intra-transmission time interval bitmaps.

10. The method of claim 9, wherein receiving the control message comprises:
receiving a single intra-transmission time interval bitmap that is used for each of the plurality of transmission time intervals.

11. The method of claim 9, further comprising:
receiving the control message or a second control message indicating a plurality of intra-transmission time interval bitmaps, each of the plurality of intra-transmission time interval bitmaps corresponding to a respective transmission time interval of the plurality of transmission time intervals.

12. The method of claim 9, wherein the one or more intra-transmission time interval bitmaps are configured per sounding reference signal resource.

13. The method of claim 1, further comprising:
disabling the inter-transmission time interval bitmap after the plurality of transmission time intervals ends.

14. The method of claim 1, wherein a size of the inter-transmission time interval bitmap corresponds to a number of repetitions configured for sounding reference signal transmission across the plurality of transmission time intervals, to a window size configured for sounding reference signal transmission, or a combination thereof.

15. A method for wireless communications at a user equipment (UE), comprising:
receiving, from a network device, control signaling indicating a sounding reference signal configuration identifying a plurality of transmission time intervals configured for sounding reference signal transmission;
receiving, from the network device and based at least in part on the sounding reference signal configuration, a control message indicating a starting location of a sounding reference signal transmission and a length of the sounding reference signal transmission within a first transmission time interval of the plurality of transmission time intervals; and
transmitting, to the network device, a sounding reference signal in the first transmission time interval in accordance with the control message.

16. The method of claim 15, wherein receiving the control message comprises:
receiving the control message indicating the starting location as an offset value from a previously configured starting location.

17. The method of claim 15, wherein receiving the control message comprises:
receiving the control message indicating a plurality of starting locations, each starting location of the plurality of starting locations configured for a respective transmission time interval of the plurality of transmission time intervals, wherein the plurality of starting locations comprises the starting location of the sounding reference signal transmission within the first transmission time interval.

18. The method of claim 15, wherein receiving the control message comprises:
receiving the control message indicating the length of the sounding reference signal transmission within the first transmission time interval that overrides a previously configured repetition factor for the sounding reference signal transmission.

19. The method of claim 15, wherein receiving the control message comprises:
receiving the control message indicating a plurality of lengths, each length of the plurality of lengths configured for a respective transmission time interval of the plurality of transmission time intervals, wherein the plurality of lengths comprises the length of the sounding reference signal transmission within the first transmission time interval.

20. The method of claim 15, further comprising:
receiving an additional control message indicating a different value for the length of the sounding reference signal transmission, wherein a previously configured repetition factor for the sounding reference signal transmission is used based at least in part on the additional control message indicating the different value for the length.

21. The method of claim 20, wherein the different value for the length comprises an invalid value or a negative value.

22. The method of claim 15, further comprising:
receiving a plurality of starting location and length pairs configured for sounding reference signal transmission, wherein the control message indicates an individual starting location and length pair of the plurality of starting location and length pairs.

23. The method of claim 22, wherein a same or different starting location and length pair is indicated for each of the plurality of transmission time intervals.

24. The method of claim 15, wherein receiving the control message comprises:
receiving the control message per sounding reference signal resource or per sounding reference signal resource set.

25. A method for wireless communications at a network device, comprising:
transmitting, to a user equipment (UE), control signaling indicating a sounding reference signal configuration identifying a plurality of transmission time intervals configured for sounding reference signal transmission;
transmitting, to the UE based at least in part on the sounding reference signal configuration, a control message indicating an inter-transmission time interval bitmap that identifies a subset of the plurality of transmission time intervals; and
receiving, from the UE, a sounding reference signal in the subset of the plurality of transmission time intervals in accordance with the inter-transmission time interval bitmap.

26. The method of claim 25, wherein transmitting the control message indicating the inter-transmission time interval bitmap comprises:
transmitting the inter-transmission time interval bitmap comprising a plurality of bits, each bit of the plurality of bits representing a respective transmission time interval of the plurality of transmission time intervals.

27. The method of claim 25, wherein transmitting the control message comprises:
transmitting the control message indicating for the UE to transmit the sounding reference signal via a specific sounding reference signal resource in each of the subset of the plurality of transmission time intervals, via each sounding reference signal of a sounding reference signal resource set in each of the subset of the plurality of transmission time intervals, via all sounding reference signal resources configured in each of the subset of the plurality of transmission time intervals, or a combination thereof.

28. A method for wireless communications at a network device, comprising:
transmitting, to a user equipment (UE), control signaling indicating a sounding reference signal configuration identifying a plurality of transmission time intervals configured for sounding reference signal transmission;
transmitting, to the UE based at least in part on the sounding reference signal configuration, a control message indicating a starting location of a sounding reference signal transmission and a length of the sounding reference signal transmission within a first transmission time interval of the plurality of transmission time intervals; and
receiving, from the UE, a sounding reference signal in the first transmission time interval in accordance with the control message.

29. The method of claim 28, wherein transmitting the control message comprises:
transmitting the control message indicating the starting location as an offset value from a previously configured starting location.

30. The method of claim 28, wherein transmitting the control message comprises:
transmitting the control message indicating a plurality of starting locations, each starting location of the plurality of starting locations configured for a respective transmission time interval of the plurality of transmission time intervals, wherein the plurality of starting locations comprises the starting location of the sounding reference signal transmission within the first transmission time interval.

* * * * *